(12) United States Patent
Honobe

(10) Patent No.: US 8,675,037 B2
(45) Date of Patent: Mar. 18, 2014

(54) TWO-WAY COMMUNICATION SYSTEM, COMMUNICATION TERMINAL DEVICE AND IMAGE MUTE CONTROL METHOD

(75) Inventor: Teruhiro Honobe, Kanagawa (JP)

(73) Assignee: Sony Corporation (JP)

( * ) Notice: Subject to any disclaimer, the term of this patent is extended or adjusted under 35 U.S.C. 154(b) by 1380 days.

(21) Appl. No.: 12/074,463

(22) Filed: Mar. 4, 2008

(65) Prior Publication Data

US 2008/0225111 A1 Sep. 18, 2008

(30) Foreign Application Priority Data

Mar. 13, 2007 (JP) .............................. P2007-063303

(51) Int. Cl.
*H04N 7/14* (2006.01)
(52) U.S. Cl.
USPC ..................................... 348/14.01; 348/14.11
(58) Field of Classification Search
USPC ........................................... 348/14.01–14.16
See application file for complete search history.

(56) References Cited

U.S. PATENT DOCUMENTS

| | | | |
|---|---|---|---|
| 5,999,207 A * | 12/1999 | Rodriguez et al. | 348/14.03 |
| 6,825,873 B2 * | 11/2004 | Nakamura et al. | 348/14.02 |
| 7,016,935 B2 | 3/2006 | Lee et al. | |
| 2003/0058486 A1 * | 3/2003 | Ogawa et al. | 358/479 |
| 2007/0003254 A1 | 1/2007 | Honobe | |

FOREIGN PATENT DOCUMENTS

| | | |
|---|---|---|
| JP | 7-115634 A | 5/1995 |
| JP | 2001-331429 A | 11/2001 |
| JP | 2001-333397 A | 11/2001 |
| JP | 2002-111896 A | 4/2002 |
| JP | 2002-354436 A | 12/2002 |
| JP | 2003-258956 A | 9/2003 |
| JP | 2004-289688 A | 10/2004 |
| JP | 2006-332968 A | 12/2006 |
| JP | 2007-013693 A | 1/2007 |

* cited by examiner

*Primary Examiner* — Curtis Kuntz
*Assistant Examiner* — Sunita Joshi
(74) *Attorney, Agent, or Firm* — Lerner, David, Littenberg, Krumholz & Mentlik, LLP

(57) ABSTRACT

A two-way communication system in which a plurality of communication terminal devices are mutually connected via a network, wherein the communication terminal devices include: a camera; and a terminal main unit; and wherein the camera includes an imaging unit configured to image a subject to output image data; and wherein the terminal main unit includes a remote control signal reception unit configured to receive a remote control signal, a communication unit configured to transmit image data to another communication terminal device, and a mute control unit configured to selectively switch the image data transmitted from the communication unit to image data output from the imaging unit or mute image data, based on a remote control signal for mute control received at the remote control signal reception unit.

13 Claims, 11 Drawing Sheets

TWO-WAY COMMUNICATION SYSTEM, COMMUNICATION TERMINAL DEVICE AND IMAGE MUTE CONTROL METHOD

CROSS-REFERENCE TO RELATED APPLICATIONS

The present application claims priority from Japanese Patent Application No. JP 2007-063303 filed in the Japanese Patent Office on Mar. 13, 2007, the entire content of which is incorporated herein by reference.

BACKGROUND OF THE INVENTION

1. Field of the Invention

The present invention relates to a two-way communication system, a communication terminal device and image mute control method, which are suitable for a video conference system or the like, for example. In detail, the present invention relates to a two-way communication system or the like which enables transmission image data to be selectively switched to imaged image data or mute image data based on a remote control signal, whereby a user can readily perform an image muting operation.

2. Description of the Related Art

There has been known a communication system which enables two-way communication by imaging being performed at each mutually distant point, and obtained image data being transmitted to and displayed at the partner's point through a network. For example, video conference systems are becoming widespread as such communication systems.

With such a video conference system, for example, as described in Japanese Unexamined Patent Application Publication No. 2001-331429, an arrangement has been made wherein before start of a conference, icons indicating the personal information of conference attendants at his/her own conference room (first conference room) and the partner's conference room (second conference room), or icons of devices set in his/her own conference room and the partner's conference room are displayed, and after connection with the partner is performed, his/her own imaged image is displayed on the partner's screen.

In the case of performing two-way communication, there has been demanded a function which enables two-way communication without displaying his/her own imaged image on the partner's screen. In the case of providing such a function, if decision is made simply so as not to transmit imaged images, at the partner's side the imaged images of the partner under communication are not displayed on the screen, which may cause a user to perform unnecessary confirmation work regarding whether or not a problem has occurred on the network or communication terminal device.

Therefore, for example, with Japanese Unexamined Patent Application Publication No. 2007-13693, description has been made wherein an imaging stopping unit made up of a shutter and so forth is provided, and when imaging is stopped by this imaging stopping unit, indicator image data indicating that imaging has been stopped is transmitted.

SUMMARY OF THE INVENTION

With the art described in Japanese Unexamined Patent Application Publication No. 2007-13693, in the case of performing image muting so as not to transmit his/her own image to the partner, there has been a need to directly operate a shutter (lens cover) provided in a camera to hide an imaging lens with the shutter thereof. Also, in the case of such a shutter being not provided, covering the front of a camera has been performed one way or another.

Thus, heretofore, in the case of performing image muting, a user needs to go to the trouble of going to the camera position to operate a shutter, and in the case of frequently turning image muting on/off, this is very troublesome.

There has been recognized the need to simplify image muting operation by a user.

With a two-way communication system according to an embodiment of the present invention in which a plurality of communication terminal devices are mutually connected via a network, the communication terminal devices include: a camera; and a terminal main unit; wherein the camera includes an imaging unit configured to image a subject to output image data; and wherein the terminal main unit includes a remote control signal reception unit configured to receive a remote control signal, a communication unit configured to transmit image data to another communication terminal device, and a mute control unit configured to selectively switch the image data transmitted from the communication unit to image data output from the imaging unit or mute image data, based on a remote control signal for mute control received at the remote control signal reception unit.

According to an embodiment of the present invention, the two-way communication system has a configuration wherein the multiple communication terminal devices are mutually connected through the network. The communication terminal devices include a camera and a terminal main unit. A terminal user is allowed to perform an image muting operation by transmitting a remote control signal to the terminal main unit.

That is to say, at the terminal main unit a remote control signal which is transmitted from a remote commander based on the user's operation is received. Subsequently, at the terminal main unit image data transmitted from the communication unit is selectively switched to imaged image data or mute image data, based on the received remote control signal. In this case, when the remote control signal (mute control signal) is in a mute ON state, mute image data is taken as the image data to be transmitted to another communication terminal device, and when the remote control signal is in a mute OFF state, image data output from the camera is taken as the image data to be transmitted to another communication terminal device.

Thus, according to an embodiment of the present invention, the user can perform an image muting operation on the remote commander, so there is no need to take the trouble to go to a camera position to operate a shutter, and even in the case of frequently turning image muting on/off, the user can readily perform an image muting operation.

Also, according to an embodiment of the present invention, for example, an arrangement may be made wherein the camera or terminal main unit is configured so as to include a storage unit for storing mute image data, and further, the terminal main unit may include a mute image data registration unit for writing mute image data in the storage unit. In this case, various types of images can be employed as a mute image to be transmitted to the partner at the time of image muting. For example, imaged image data may be written in the storage unit by the mute image data registration unit. Thus, an arbitrary imaged image can be employed as a mute image. Also, for example, image data to be input to an external input terminal is written in the storage unit by the mute image data registration unit. Thus, for example, an image created at a computer, or an image played at an image playing device such as a DVD player or the like, can be employed as a mute image.

Also, according to an embodiment of the present invention, for example, an arrangement may be made wherein the camera or terminal main unit is configured so as to include a storage unit for storing multiple types of mute image data, and further, the terminal main unit may include a mute image selecting unit for selecting mute image data to be employed from the multiple types of mute image data written in the storage unit based on the user's selection operation. In this case, the user can use arbitrary image data by selecting this from the multiple types of mute image data.

Also, the terminal main unit may be configured so as to include a storage unit configured to store the mute image data, and an image switching unit configured to selectively extract image data output from the imaging unit or mute image data read out from the storage unit, and with the mute control unit controlling the switching operation of the image switching unit, based on the remote control signal for mute control. In this case, the mute control unit controls the switching operation of the image switching unit which exists in the same terminal main unit as his/her own terminal main unit, which simplifies the configuration of the image switching control system.

Also, the terminal main unit may be configured so as to include the storage unit and image switching unit as described above, with the terminal main unit including an image compression unit configured to compression-encode image data output from the imaging unit, mute image data stored in the storage unit is compression-encoded, and the image switching unit extracts compression-encoded image data output from the image compression unit or compression-encoded mute image data read out from the storage unit. In this case, the mute image data stored in the storage unit has been already compression-encoded, whereby when extracting mute image data from the image switching unit during image muting, the compression encoding operation at the image compression unit can be stopped, the processing load at the terminal main unit can be reduced, and also power-saving can be realized.

Also, the camera may be configured so as to include a storage unit configured to store the mute image data, an image switching unit configured to selectively extract image data output from the imaging unit or mute image data read out from the storage unit, and a switching control unit configured to control the switching operation of the image switching unit, and the mute control unit supplies control information to the switching control unit, based on the remote control signal for mute control. In this case, the mute control unit of the terminal main unit only needs to supply control information to the switching control unit of the camera, so the processing load of a CPU (Central Processing Unit) making up the mute control unit at the terminal main unit can be reduced.

Also, the communication terminal device may further include a microphone, with the communication unit transmitting the image data, and audio data output from the microphone to the other communication terminal device, the terminal main unit further including an audio muting unit configured to mute the audio data transmitted from the communication unit, and the mute control unit selectively switching the image data transmitted from the communication unit to image data output from the imaging unit or mute image data, and also controls the mute operation of the audio muting unit, based on a remote control signal for mute control received at said remote control signal reception unit. In this case, the user can mute an image and audio simultaneously by a mute operation on the remote commander.

Also, the communication terminal device may be capable of muting an image and audio simultaneously as described above, and further include an image muting setting unit configured to validate or invalidate control operation wherein when the remote control signal for mute control is in a mute ON state, the mute control unit switches the image data transmitted from the communication unit to the mute image data, based on the user's operation. Thus, the user can arbitrarily set whether or not image muting can be performed simultaneously with audio muting.

According to embodiments of the present invention, transmission image data can be selectively switched to imaged image data or mute image data based on the remote control signal, whereby the image muting operation by the user can be simplified.

DESCRIPTION OF THE PREFERRED EMBODIMENTS

Description will be made below regarding embodiments of the present invention with reference to the drawings.

Figure 1:
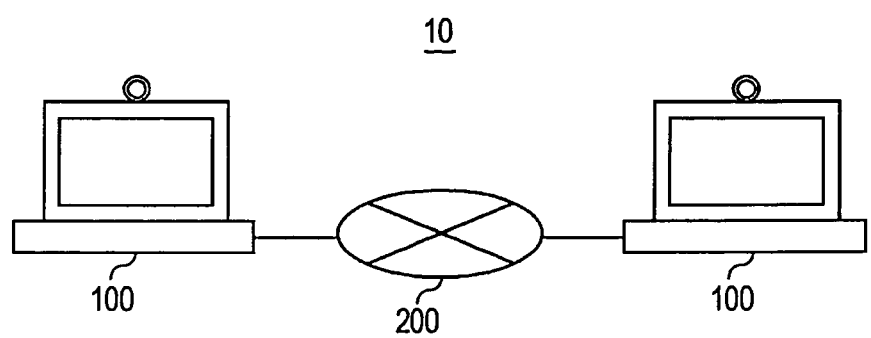
FIG. 1 is a block diagram illustrating a configuration example of a two-way communication system serving as an embodiment.

FIG. 1 illustrates a configuration example of a two-way communication system 10 serving as an embodiment. The two-way communication system 10 is configured by multiple (only two are shown in FIG. 1) communication terminal devices 100 being mutually connected via a network 200 such as a LAN (Local Area Network), the Internet, or the like.

Figure 2:
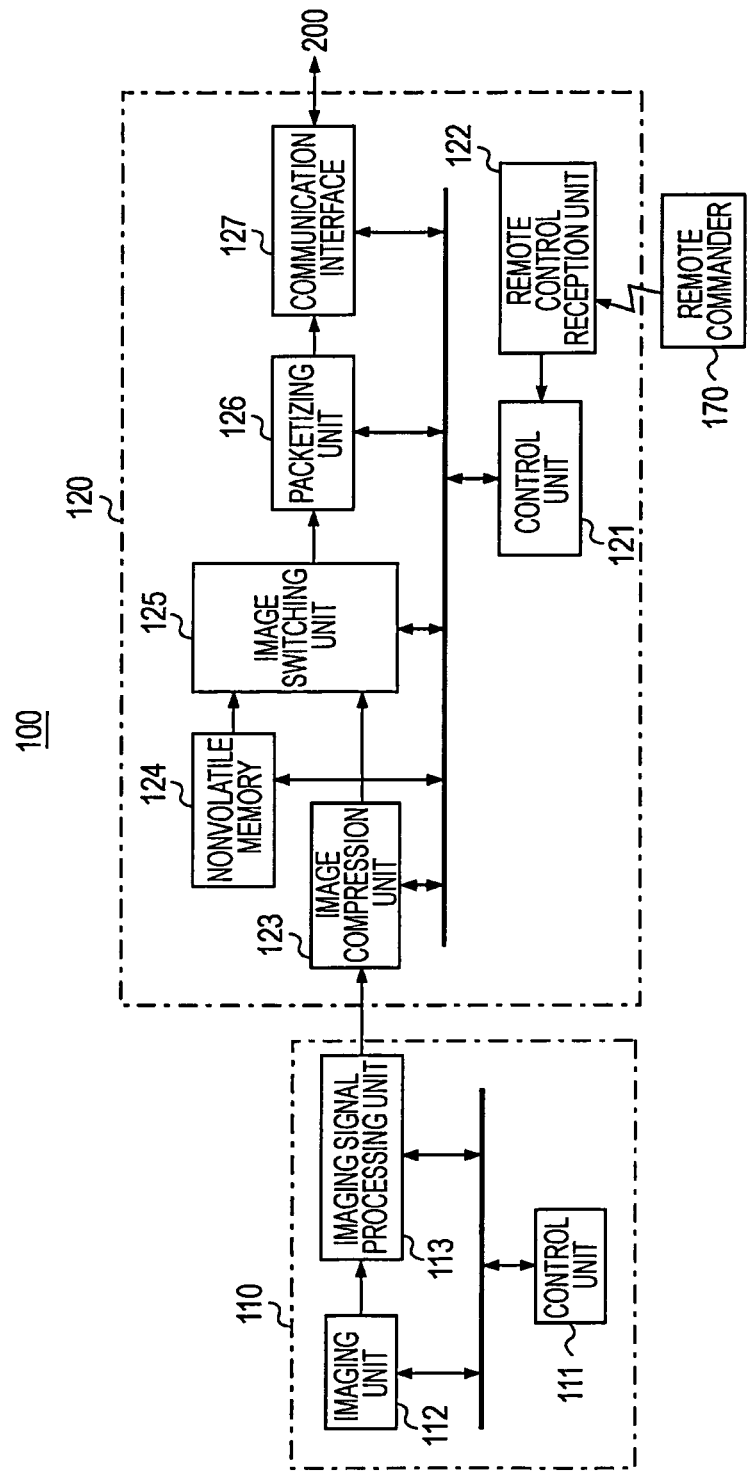
FIG. 2 is a block diagram illustrating a configuration example of the image transmission system of a communication terminal device making up the two-way communication system.

FIG. 2 illustrates a configuration example of the image data transmission system of the communication terminal device 100. That is to say, in FIG. 1, the image data reception system, audio data transmission system and reception system are omitted in the drawing. The communication terminal device 100 includes a camera 110 and a terminal main unit 120.

The camera 110 includes a control unit 111, an imaging unit 112, and an imaging signal processing unit 113. The control unit 111 controls the operation of each unit of the camera 110. The control unit 111 is configured of a CPU. The imaging unit 112, which includes an unshown imaging lens and imaging device, images a subject to output the imaged signal corresponding to the subject thereof. The imaging device is an imaging device such as a CCD (Charge Coupled Device) or CMOS (Complementary Metal-Oxide Semiconductor) or the like. The imaging signal processing unit 113 subjects the imaging signal (analog signal) output from the imaging unit 112 to sample holding, gain control, conversion from the analog signal to a digital signal, white balance adjustment, gamma correction, and so forth, and outputs the image data (imaged image data).

The terminal main unit 120 includes a control unit 121, a remote control signal reception unit 122 (hereafter, referred to as a remote control reception unit 122), an image compression unit 123, non-volatile memory 124, an image switching unit 125, a packetizing unit 126, and a communication interface 127.

The control unit 121 controls the operation of each unit of the terminal main unit 120. The control unit 121 is configured of a CPU. The remote control reception unit 122 receives a remote control signal generated from a remote commander 170 corresponding to the user's operation, such as an infrared light or the like. The remote control reception unit 122 is connected to the control unit 121. The remote control reception unit 122 supplies the operating signal corresponding to the received remote control signal to the control unit 121.

The image compression unit 123 compression-encodes the image data output from the camera 110. The image compression unit 123 subjects the image data to compression processing using a compression method in accordance with predetermined specifications, for example, such as H.323 standardized by ITU (International Telecommunication Union) to generate compressed image data (compression-encoded image data).

The non-volatile memory 124, which makes up a storage unit, stores compression-encoded mute image data. The image switching unit 125 selectively extracts the compressed image data output from the image compression unit 123, or the mute image data read out from the non-volatile memory 124. The packetizing unit 126 packetizes the compressed image data extracted at the image switching unit 125 in a predetermined format. The communication interface 127 transmits the packet data obtained at the packetizing unit 126 to the other communication terminal device 100 via the network 200.

Note that terms "image muting", "mute image" and so forth, which refer to a regular video conferencing picture being blocked from sight of the other party by something else being presented to the other party (a blank screen, another image, etc.) in the present specification, do not follow the general use of the English term "mute", which is usually associated only with sound and not images. However, in the field of video conferencing, as well as some other fields, this term is more or less accepted, and accordingly the term "mute" and variations thereof as used in the present specification are not restricted to sound, and interpretation of the terms should follow the context of the description.

The operation of the image data transmission system of the communication terminal device 100 shown in FIG. 2 will be described. A subject is imaged, that is to say, captured as an image, by the imaging unit 112 of the camera 110. For example, in the case of the two-way communication system 10 making up a video conference system, subjects are conference attendants. The imaging signal (analog signal) output from the imaging unit 112 is supplied to the imaging signal processing unit 113. At the imaging signal processing unit 113 the imaging signal thereof is subjected to analog signal processing such as sample holding, gain control, and so forth, A/D conversion processing, and further, digital signal processing such as white balance adjustment, gamma correction, and so forth, and then image data (imaged image data) is generated.

The image data generated at the imaging signal processing unit 113 of the camera 110 is supplied to the image compression unit 123 of the terminal main unit 120. At the image compression unit 123 the image data is subjected to the compression processing, and compressed image data is generated. This compressed image data is supplied to the image switching unit 125.

With the image switching unit 125, in a mute released state, the compressed image data (imaged image data) from the image compression unit 123 is extracted. On the other hand, in a mute state, mute image data is read out from the non-volatile memory 124 under the control of the control unit 121, and supplied to the image switching unit 125, and the mute image data thereof is extracted at the image switching unit 125.

Whether to set either a mute released state or a mute state is controlled by the control unit 121. That is to say, in a mute released state, when a mute button on the remote commander 170 is pressing-operated by the user, and the remote control signal for mute control is received at the remote control reception unit 122, the control unit 121 determines that a mute ON operation has been performed, and switches from a mute released state to a mute state. Conversely, in a mute state, similarly, when the remote control signal for mute control is received at the remote control reception unit 122, the control unit 121 determines that a mute OFF operation has been performed, and switches from a mute state to a mute released state. In this case, the control unit 121 makes up a mute control unit.

The compressed image data extracted at the image switching unit 125 is supplied to the packetizing unit 126. At the packetizing unit 126 the compressed image data is packetized in a predetermined format. The packet data packetized and obtained at the packetizing unit 126 is transmitted to the other communication terminal device 100 via the network 200 by the communication interface 127.

In this case, in a mute released state, imaged image data is transmitted to the other communication terminal device 100, and the imaged image is displayed on the display of the other communication terminal device 100. On the other hand, in a mute state, mute image data is supplied to the other communication terminal device 100, and the mute image is displayed on the display of the other communication terminal device 100.

Figure 3:
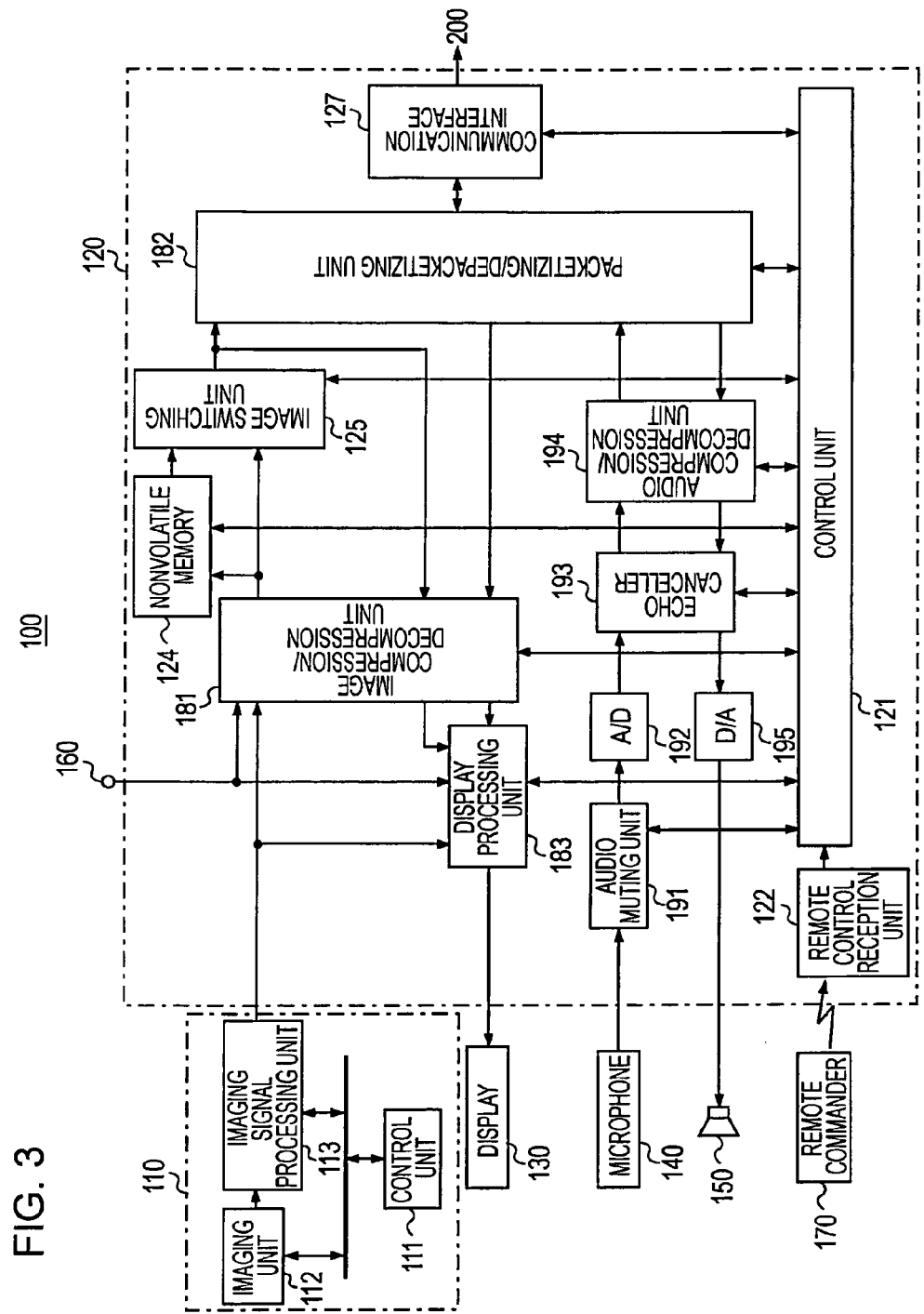
FIG. 3 is a block diagram illustrating an overall configuration example of the communication terminal device making up the two-way communication system.

FIG. 3 illustrates an overall configuration example of the communication terminal device 100, which corresponds to FIG. 2. In FIG. 3, the components corresponding to those in FIG. 2 are denoted with the same reference numerals, and description thereof will be omitted as appropriate. This communication terminal device 100 includes a camera 110, a terminal main unit 120, a display 130, a microphone 140, speakers 150, and an external input terminal 160.

The camera 110 includes a control unit 111, an imaging unit 112, and an imaging signal processing unit 113. The control unit 111 controls the operation of each unit of the camera 110. The imaging unit 112, which includes an unshown imaging lens and imaging device, images (captures) a subject, and outputs the imaging signal corresponding to the subject thereof. The imaging signal processing unit 113 subjects the imaging signal (analog signal) output from the imaging unit 112 to sample holding, gain control, conversion from the analog signal to a digital signal, white balance adjustment, gamma correction, and so forth, and outputs the image data (imaged image data).

The terminal main unit 120 includes a control unit 121, a remote control reception unit 122, non-volatile memory 124, an image switching unit 125, a communication interface 127, an image compression/decompression unit 181, a packetizing/depacketizing unit 182, a display processing unit 183, an audio muting unit 191, an A/D converter 192, an echo canceller 193, an audio compression/decompression unit 194, and a D/A converter 195.

The control unit 121 controls the operation of each unit of the terminal main unit 120. The remote control reception unit 122 receives a remote control signal generated from the remote commander 170 corresponding to the user's operation, such as an infrared light or the like. The remote control reception unit 122 supplies the operating signal corresponding to the received remote control signal to the control unit 121.

The image compression/decompression unit 181 subjects the image data output from the camera 110, or image data input to the external input terminal 160 from a computer or an image playing device such as a DVD (Digital Versatile Disc) player or the like to compression processing using a compression method in accordance with predetermined specifications, for example, such as H.323 standardized by ITU to generate compressed image data (compression-encoded image data).

In this case, in a mute released state, when transmitting the imaged image data to the other communication terminal device 100, the image compression/decompression unit 181 subjects the image data output from the camera 110 to the compression processing to generate compression-encoded image data. Also, in a mute state, when transmitting the image data input to the external input terminal 160 to the other communication terminal device 100 as mute image data, the image compression/decompression unit 181 subjects the image data input to the external input terminal 160 to the compression processing to generate compression-encoded image data.

Also, when registering a mute image, the image compression/decompression unit 181 subjects the image data output from the camera 110, or the image data input to the external input terminal 160 to the compression processing to generate compressed image data. Here, registration of the mute image is performed by the user operating the remote commander 170.

Also, the image compression/decompression unit 181 subjects the compressed image data from the other communication terminal device 100, which is reconfigured by the packetizing/depacketizing unit 182, to the decompression processing to generate decoded image data (reception image data).

Further, the image compression/decompression unit 181 subjects the compressed image data output from the image switching unit 125 to the decompression processing as appropriate to generate decoded image data (transmission image data).

The non-volatile memory 124 makes up a storage unit, and stores mute image data. Here, one set or multiple sets of mute image data are stored in the non-volatile memory 124 beforehand. Also, with the present embodiment, the image data output from the camera 110, or the image data input to the external input terminal 160 is written in the non-volatile memory 124, whereby a predetermined number of mute image data can be registered. The control processing of the control unit 121 at the time of registering a mute image will be described later.

The image switching unit 125 selectively extracts the compressed image data output from the image compression/decompression unit 181, or the compression-encoded mute image data read out from the non-volatile memory 124, and outputs this to the packetizing/depacketizing unit 182.

In this case, in a mute released state, when transmitting the imaged image data to the other communication terminal device 100, the image switching unit 125 extracts the compressed image data generated at the image compression/decompression unit 181. Also, in a mute state, when transmitting the mute image data stored in the non-volatile memory 124 to the other communication terminal device 100, the image switching unit 125 extracts the mute image data read out from the non-volatile memory 124.

As described above, multiple sets of mute image data can be stored in the non-volatile memory 124. With the present embodiment, in the case of multiple sets of mute image data being stored in the non-volatile memory 124, the mute image data to be used can be set. The control processing of the control unit 121 at the time of setting a mute image will be described later.

Also, in a mute state, when transmitting the image data input to the external input terminal 160 to the other communication terminal device 100 as mute image data, the image switching unit 125 extracts the compressed image data generated at the image compression/decompression unit 181.

The packetizing/depacketizing unit 182 packetizes the compressed image data extracted at the image switching unit 125, and the compressed audio data obtained at the audio compression/decompression unit 194 in a predetermined format, and outputs the obtained packet data to the communication interface 127. Also, the packetizing/depacketizing unit 182 extracts compressed image data and compressed audio data from the packet data transmitted from the other communication terminal device 100, which is received at the communication interface 127, transmits the extracted compressed image data to the image compression/decompression unit 181, and transmits the extracted compressed audio data to the audio compression/decompression unit 194.

The communication interface 127 transmits the packet data obtained at the packetizing/depacketizing unit 182 to the other communication terminal device 100 via the network 200. Also, the communication interface 127 receives the packet data transmitted from the other communication terminal device 100 via the network 200, and transmits this to the packetizing/depacketizing unit 182.

The image data (imaged image data) output from the camera 110, the image data input to the external input terminal 160, and two sets of decoded image data (reception image data and transmission image data) obtained at the image compression/decompression unit 181 are supplied to the display processing unit 183. The display processing unit 183 supplies such image data as is or after processing to the display 130.

For example, in the case of performing full screen display under communication with the other communication terminal device 100, the display processing unit 183 supplies the reception image data obtained at the image compression/decompression unit 181 as is to the display 130. In this case, the image according to the image data received from the other communication terminal device 100 is full-screen-displayed on the display 130.

Also, for example, in the case of performing two-screen display under communication with the other communication terminal device 100, based on the reception image data and transmission image data obtained at the image compression/decompression unit 181, the display processing unit 183 generates new image data for arraying and displaying the images according to those two sets of image data on the same screen, and supplies the new image data thereof to the display 130. In this case, the image according to the image data received from the other communication terminal device 100, and the image according to the image data transmitted to the other communication terminal device 100 are arrayed and displayed on the display 130.

Also, for example, when registering a mute image, the display processing unit 183 supplies the image data (imaged image data) output from the camera 110, or the image data input to the external input terminal 160 as is to the display 130. In this case, the image according to the image data written in the non-volatile memory 124 is displayed on the display 130.

Also, for example, when setting a mute image, the display processing unit 183 supplies the transmission image data obtained at the image compression/decompression unit 181 as is to the display 130. In this case, the image according to the mute image data read out from the non-volatile memory 124 is displayed on the display 130.

The audio muting unit 191 is disposed between the microphone 140 and A/D converter 192. In a mute released state, the audio muting unit 191 does not attenuate the level of the audio signal supplied from the microphone 140 to the A/D converter 192. On the other hand, in a mute sate, the audio muting unit 191 attenuates the level of the audio signal supplied from the microphone 140 to the A/D converter 192.

The A/D converter 192 converts the audio signal (analog signal) supplied from the microphone 140 into a digital signal. The echo canceller 193 generates a correction signal based on the decoded audio data obtained at the audio compression/decompression unit 194, and corrects the audio data obtained at the A/D converter 192 using the correction signal thereof to secure speech quality.

The audio compression/decompression unit 194 subjects the audio data (transmission audio data) corrected at the A/D converter 192 through echo canceller 193 to compression processing of a compression method in accordance with predetermined specifications such as H.323 or the like in the same way as with the above-mentioned image data to generate compressed audio data. Also, the audio compression/decompression unit 194 subjects the compressed audio data from the other communication terminal device 100, which is reconfigured at the packetizing/depacketizing unit 182, to the decompression processing to generate decoded audio data (reception audio data).

The operation at the time of communication of the communication terminal device 100 shown in FIG. 3 will be described. First, the operation of the transmission system will be described.

A subject is imaged by the imaging unit 112 of the camera 110. For example, in the case of the two-way communication system 10 (see FIG. 1) making up a video conference system, subjects are conference attendants. The imaging signal (analog signal) output from the imaging unit 112 is supplied to the imaging signal processing unit 113. At the imaging signal processing unit 113 the imaging signal thereof is subjected to analog signal processing such as sample holding, gain control, and so forth, A/D conversion processing, and further, digital signal processing such as white balance adjustment, gamma correction, and so forth, and then image data (imaged image data) is generated.

The image data generated at the imaging signal processing unit 113 of the camera 110 is supplied to the image compression/decompression unit 181 of the terminal main unit 120. Also, the image data from a computer, image playing device, or the like, which is input to the external input terminal 160, is also supplied to the image compression/decompression unit 181.

The operation of the image transmission system of the image compression/decompression unit 181 and thereafter will be described by dividing this into a mute released state and a mute state.

First, description will be made regarding the case of being in a mute released state. At the image compression/decompression unit 181 the image data (imaged image data) from the camera 110 is subjected to the compression processing, and compressed image data is generated. Subsequently, this compressed image data is supplied to the packetizing/depacketizing unit 182 via the image switching unit 125.

Next, description will be made regarding the case wherein in a mute state, the image data input to the external input terminal 160 is employed as mute image data. At the image compression/decompression unit 181 the image data input to the external input terminal 160 is subjected to the compression processing, and compressed image data is generated. Subsequently, this compressed image data is supplied to the packetizing/depacketizing unit 182 via the image switching unit 125.

Also, description will be made regarding the case wherein in a mute state, the mute image data stored in the non-volatile memory 124 is employed. In this case, at the image compression/decompression unit 181 no compression processing is performed. Predetermined mute image data, which is set as mute image data to be used beforehand, is read out from the non-volatile memory 124 by the control of the control unit 121. Subsequently, this mute image data is supplied to the packetizing/depacketizing unit 182 via the image switching unit 125.

Note that in mute state, whether to use the image data input to the external input terminal 160 or the mute image data stored in the non-volatile memory 124 can be changed by the user operating the remote commander 170 as appropriate.

Also, the audio signal output from the microphone 140 is supplied to the A/D converter 192 via the audio muting unit 191, and converted from the analog signal to a digital signal. The audio muting unit 191 is disposed between the microphone 140 and the A/D converter 192. At the audio muting unit 191, the level of the audio signal supplied to the A/D converter 192 from the microphone 140 is not attenuated in a mute released state, but is in a mute state.

The audio data obtained at the A/D converter 192 is supplied to the audio compression/decompression unit 194 via the echo canceller 193. At the audio compression/decompression unit 194 the audio data (transmission audio data) is subjected to the compression processing, and compressed audio data is generated. Subsequently, this compressed audio data is supplied to the packetizing/depacketizing unit 182.

At the packetizing/depacketizing unit 182 the compressed image data supplied from the image switching unit 125 and the compressed audio data supplied from the audio compression/decompression unit 194 are packetized in a predetermined format, and the obtained packet data is transmitted to the other communication terminal device 100 via the network 200 by the communication interface 127.

Thus, in a mute released state, the image data (imaged image data) output from the camera 110 is supplied to the other communication terminal device 100, and the image according to the image data thereof is displayed. Also, in a mute released state, the audio signal from the microphone 140 is supplied to the other communication terminal device 100, of which the level is not attenuated, and the audio according to the audio signal thereof is output.

On the other hand, in a mute state, the image data input to the external input terminal 160, or the mute image data read out from the non-volatile memory 124 is supplied to the other communication terminal device 100, and the mute image according to the image data thereof is displayed. Also, in a mute state, the audio signal from the microphone 140 is supplied to the other communication terminal device 100, of which the level is attenuated, and the audio is subjected to muting.

Here, whether to set a mute released state or mute state is controlled by the control unit 121. That is to say, in a mute released state, when the mute button on the remote commander 170 is pressing-operated by the user, and the remote control signal for mute control is received at the remote control reception unit 122, the control unit 121 determines that a mute ON operation has been performed, and switches from a mute released state to a mute state. Conversely, in a mute state, similarly, when the remote control signal for mute control is received at the remote control reception unit 122, the control unit 121 determines that a mute OFF operation has been performed, and switches from a mute state to a mute released state.

Figure 4:
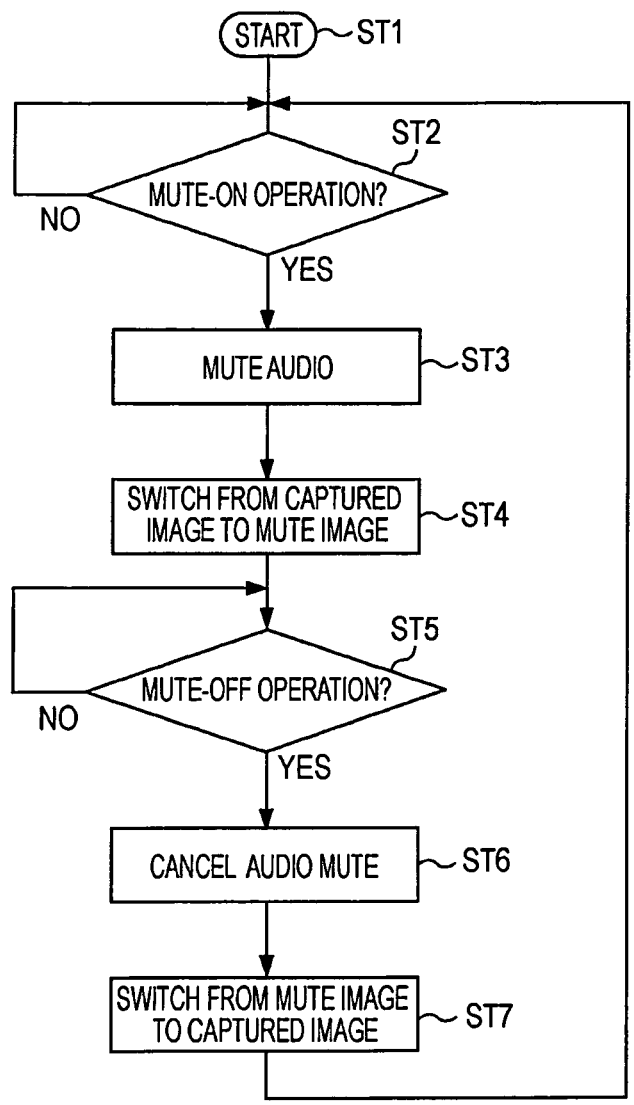
FIG. 4 is a flowchart illustrating mute control processing at a control unit of the terminal main unit.

The flowchart in FIG. 4 illustrates the mute control processing at the control unit 121. In step ST1, the control unit 121 starts the processing, and subsequently, proceeds to step ST2. Now, let us say that the initial state is a mute released state. In step ST2, the control unit 121 determines whether or not a mute ON operation has been performed.

When determining that a mute ON operation has been performed, in step ST3 the control unit 121 mutes the audio. That is to say, the control unit 121 controls the audio muting unit 191 to attenuate the level of the audio signal supplied to the A/D converter 192 from the microphone 140.

Subsequently, in step ST4, the control unit 121 switches from the imaged image to the mute image. That is to say, when employing the image data input to the external input terminal 160 as mute image data, the control unit 121 controls the image compression/decompression unit 181 to subject the image data input to the external input terminal 160 to the compression processing, and controls the image switching unit 125 to extract the compressed image data obtained at the image compression/decompression unit 181. Also, when employing the mute image data stored in the non-volatile memory 124, the control unit 121 controls the non-volatile memory 124 to read out the mute image data, and controls the image switching unit 125 to extract the mute image data read out from the non-volatile memory 124.

Next, in step ST5, the control unit 121 determines whether or not a mute OFF operation has been performed. Upon a mute OFF operation having been performed, in step ST6 the control unit 121 releases audio muting. That is to say, the control unit 121 controls the audio muting unit 191 so as not to attenuate the level of the audio signal supplied to the A/D converter 192 from the microphone 140.

Subsequently, in step ST7, the control unit 121 switches from the mute image to the imaged image. That is to say, the control unit 121 controls the image compression/decompression unit 181 to subject the image data output from the camera 110 to the compression processing, and controls the image switching unit 125 to extract the compressed image data obtained at the image compression/decompression unit 181.

The control unit 121 returns to step ST2 following the processing in step ST7. Thus, each time the mute button on the remote commander 170 is pressing-operated by the user, and the remote control signal for mute control is received at the remote control reception unit 122, the communication terminal device 100 is set alternately to a mute released state or mute state by the control of the control unit 121.

Next, the operation of the reception system will be described. The packet data transmitted from the other communication terminal device 100 via the network 200, which is received at the communication interface 127, is supplied to the packetizing/depacketizing unit 182. At the packetizing/depacketizing unit 182 compressed image data and compressed audio data are extracted from the packet data supplied from the communication interface 127, and the compressed image data is supplied to the image compression/decompression unit 181, and the audio compressed data is supplied to the audio compression/decompression unit 194.

At the image compression/decompression unit 181 the compressed image data supplied from the packetizing/depacketizing unit 182 is subjected to decompression processing, and decoded image data (reception image data) is generated. This image data is supplied to the display processing unit 183. Subsequently, in the case of full screen display being performed on the display 130, the reception image data obtained at the image compression/decompression unit 181 is supplied as is from the display processing unit 183 to the display 130, and the image according to the reception image data from the other communication terminal device 100 is full-screen-displayed on the display 130.

Also, in the case of two-screen display being performed on the display 130, at the image compression/decompression unit 181 the compressed image data output from the image switching unit 125 is subjected to the decompression processing, and decoded image data (transmission image data) is generated. In this case, at the display processing unit 183, based on the reception image data and transmission image data obtained at the image compression/decompression unit 181, new image data for arraying and displaying the images according to those two sets of image data on the same screen is generated. Subsequently, the new image data thereof is supplied from the display processing unit 183 to the display 130, and the image according to the reception image data from the other communication terminal device 100, and the image according to the image data transmitted to the other communication terminal device 100 are arrayed and displayed on the display 130.

Figure 5:
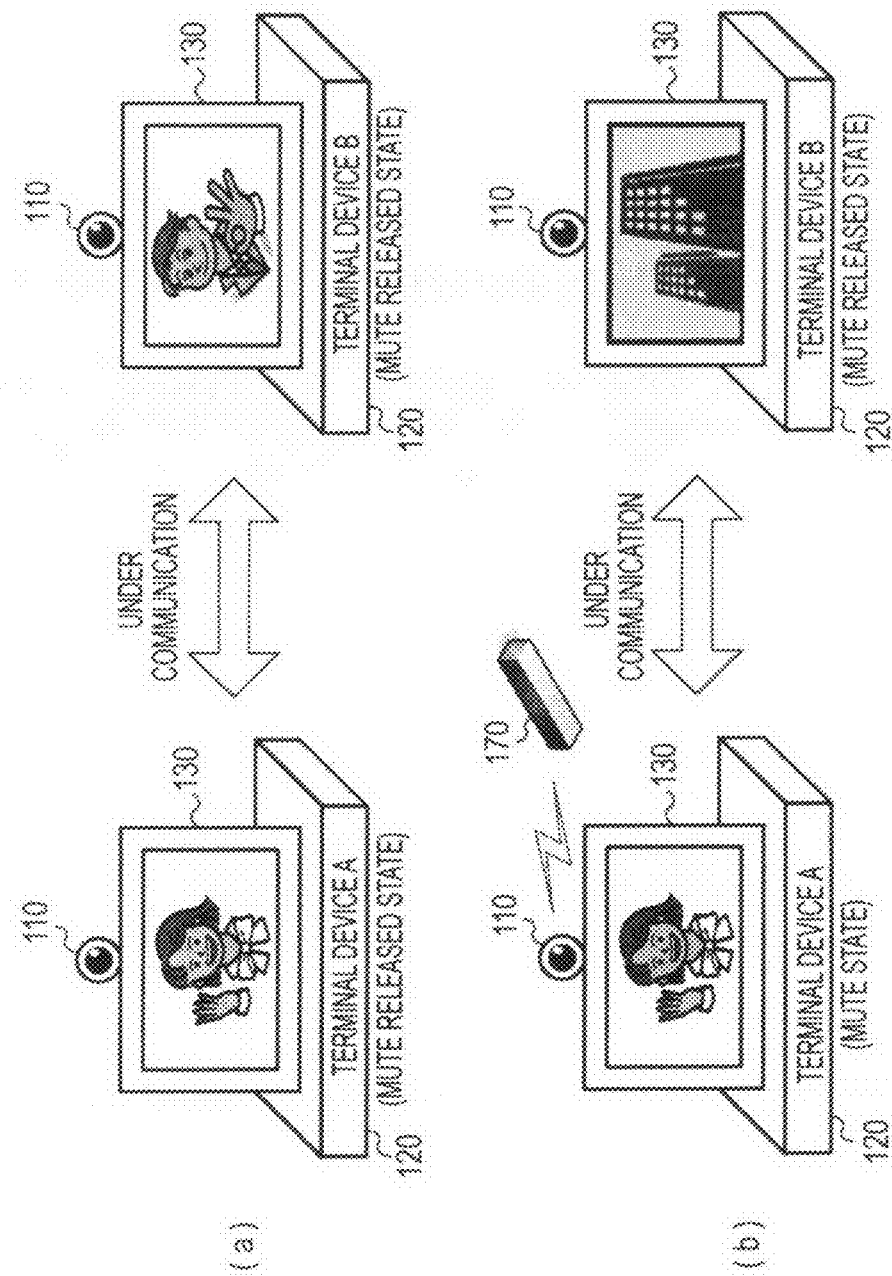
FIG. 5 is a diagram illustrating display examples under communication with full screen display.

In FIG. 5, (a) and (b) illustrate display examples of the display 130 of each terminal device in the case of communication being performed between a terminal device A and a terminal device B which are configured such as shown in FIG. 3. In FIG. 5, (a) is an example of full screen display, which illustrates the case wherein both of the terminal device A and terminal device B are in a mute released state. In this case, at both of the terminal device A and terminal device B the imaged image at the partner side is mutually displayed on the display 130.

Also, (b) in FIG. 5 is an example of full screen display, which illustrates the case wherein the terminal device B is in a mute released state, but the terminal device A is in a mute state by the user operating the remote commander 170. In this case, the imaged image of the terminal device B is displayed on the display 130 of the terminal device A, but the mute image is displayed on the display 130 of the terminal device B.

Figure 6:
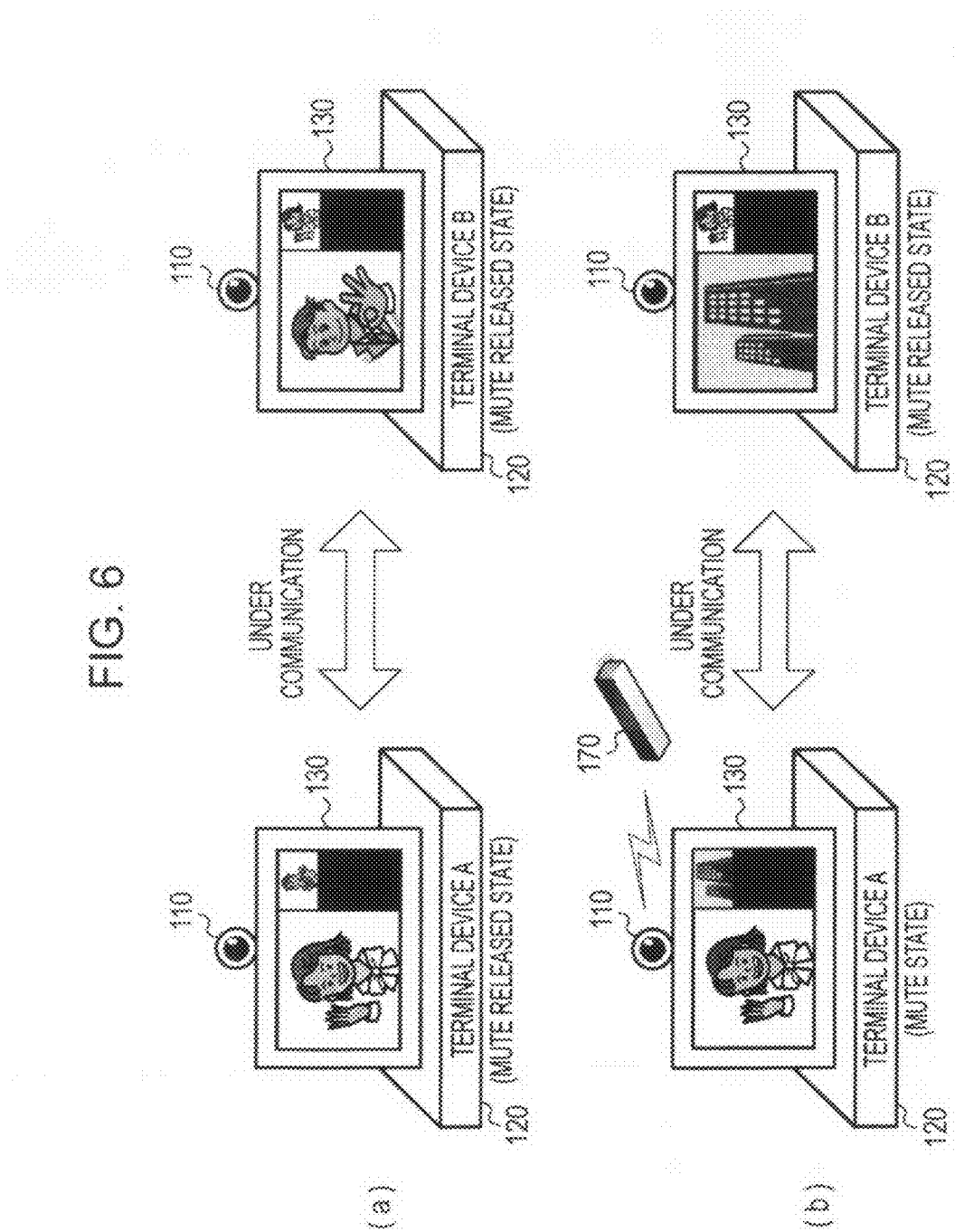
FIG. 6 is a diagram illustrating display examples under communication with two-screen display.

Also, (a) and (b) in FIG. 6 also illustrate display examples of the display 130 of each terminal device in the case of communication being performed between the terminal device A and terminal device B which are configured such as shown in FIG. 3. In FIG. 6, (a) is an example of two-screen display, which illustrates the case wherein both of the terminal device A and terminal device B are in a mute released state. In this case, at both of the terminal device A and terminal device B the imaged image (great image) at the partner's side and his/her own imaged image (small image) are displayed on the display 130.

Also, (b) in FIG. 6 is an example of full screen display, which illustrates the case wherein the terminal device B is in a mute released state, but the terminal device A is in a mute state by the user operating the remote commander 170. In this case, the imaged image (great image) and mute image (small image) of the terminal device B are displayed on the display 130 of the terminal device A, and the mute image (great image) and his/her own imaged image (small image) are displayed on the display 130 of the terminal device B.

Also, at the audio compression/decompression unit 194 the compressed audio data supplied from the packetizing/depacketizing unit 182 is subjected to the decompression processing, and decoded audio data (reception audio data) is generated. This reception audio data is supplied to the D/A converter 195 via the echo canceller 193, where the digital signal is converted into an analog signal. Subsequently, the reception audio signal output from the D/A converter 195 is supplied to the speakers 150. Thus, the audio according to the reception audio signal is output from the speakers 150.

Next, the operation at the time of registering a mute image of the communication terminal device 100 shown in FIG. 3 will be described. As described above, the image data output from the camera 110, or the image data input to the external input terminal 160 is written in the non-volatile memory 124, whereby a predetermined number of mute image data can be newly registered.

Figure 7:
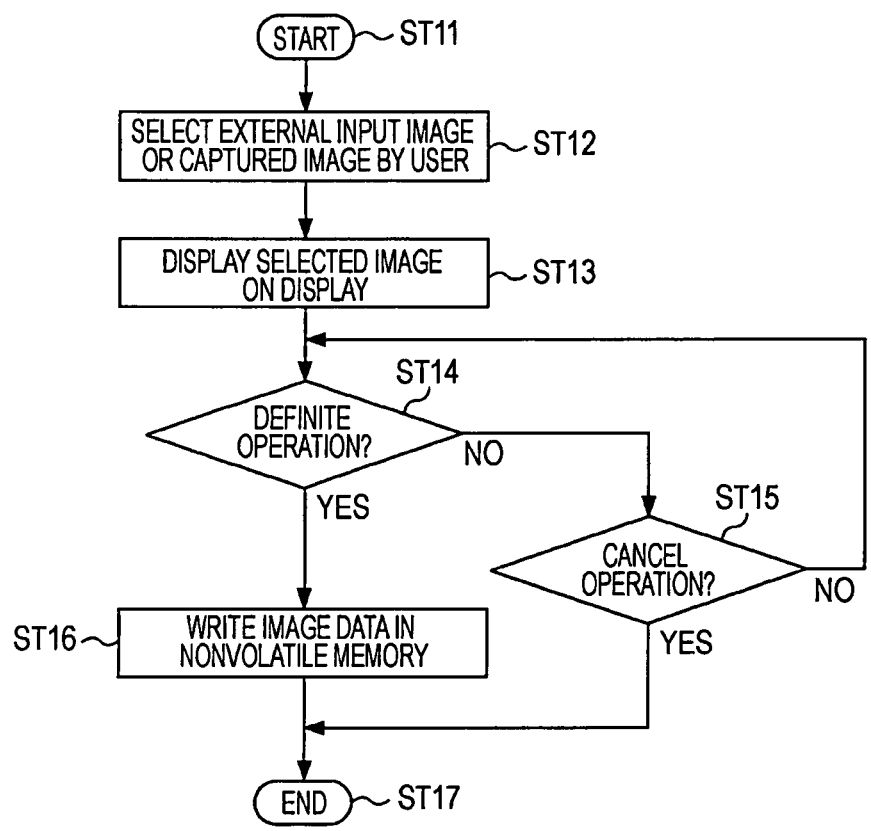
FIG. 7 is a flowchart illustrating mute image registration processing at the control unit of the terminal main unit.

The flowchart in FIG. 7 illustrates control processing at the control unit 121 at the time of registering a mute image. In this case, the control unit 121 makes up a mute image registration unit.

First, in step ST11, the control unit 121 starts the processing based on the user's mute image registration start operation, and subsequently, proceeds to step ST12. Subsequently, upon the user selecting an external input image or imaged image as an image to be registered as a mute image in step ST12, the control unit 121 proceeds to step ST13. In step ST13, the control unit 121 displays the selected image on the display 130.

In this case, when the external input image is selected in step ST12, control is performed so as to supply the image data input to the external input terminal 160 to the display 130 from the display processing unit 183, and the external input image is displayed on the display 130. Also, when the imaged image is selected in step ST12, control is performed so as to supply the image data (imaged image data) output from the camera 110 to the display 130 from the display processing unit 183, and the imaged image is displayed on the display 130. Thus, the external input image or imaged image is displayed on the display 130, whereby the user can confirm in advance the external input image or imaged image to be registered as a mute image.

Next, in step ST14, the control unit 121 determines whether or not a decision operation by the user has been performed. In the case of no decision operation having been performed, in step ST15 the control unit 121 determines whether or not a cancel operation by the user has been performed. In the case of no cancel operation having been performed, the control unit 121 returns to step ST14.

When determination is made in step ST14 that there has been performed a decision operation, the flow proceeds to step ST16, where the control unit 121 writes one frame worth of image data in the non-volatile memory 124 as mute image data. In this case, when the external input image is selected in step ST12, at the image compression/decompression unit 181 the image data input to the external input terminal 160 is subjected to the compression processing, and the obtained compressed image data is written in the non-volatile memory 124. Also, when the imaged image is selected in step ST12, at the image compression/decompression unit 181 the image data (imaged image data) output from the camera 110 is subjected to the compression processing, and the obtained compressed image data is written in the non-volatile memory 124.

Following the processing in step ST16, in step ST17 the control unit 121 ends the processing. Note that when determination is made in step ST17 that there has been performed a cancel operation, the control unit 121 immediately proceeds to step ST17 to end the processing.

Next, the operation at the time of setting a mute image of the communication terminal device 100 shown in FIG. 3 will be described. As described above, multiple sets of mute image data can be stored in the non-volatile memory 124, whereby the mute image data that should be used can be set.

Figure 8:
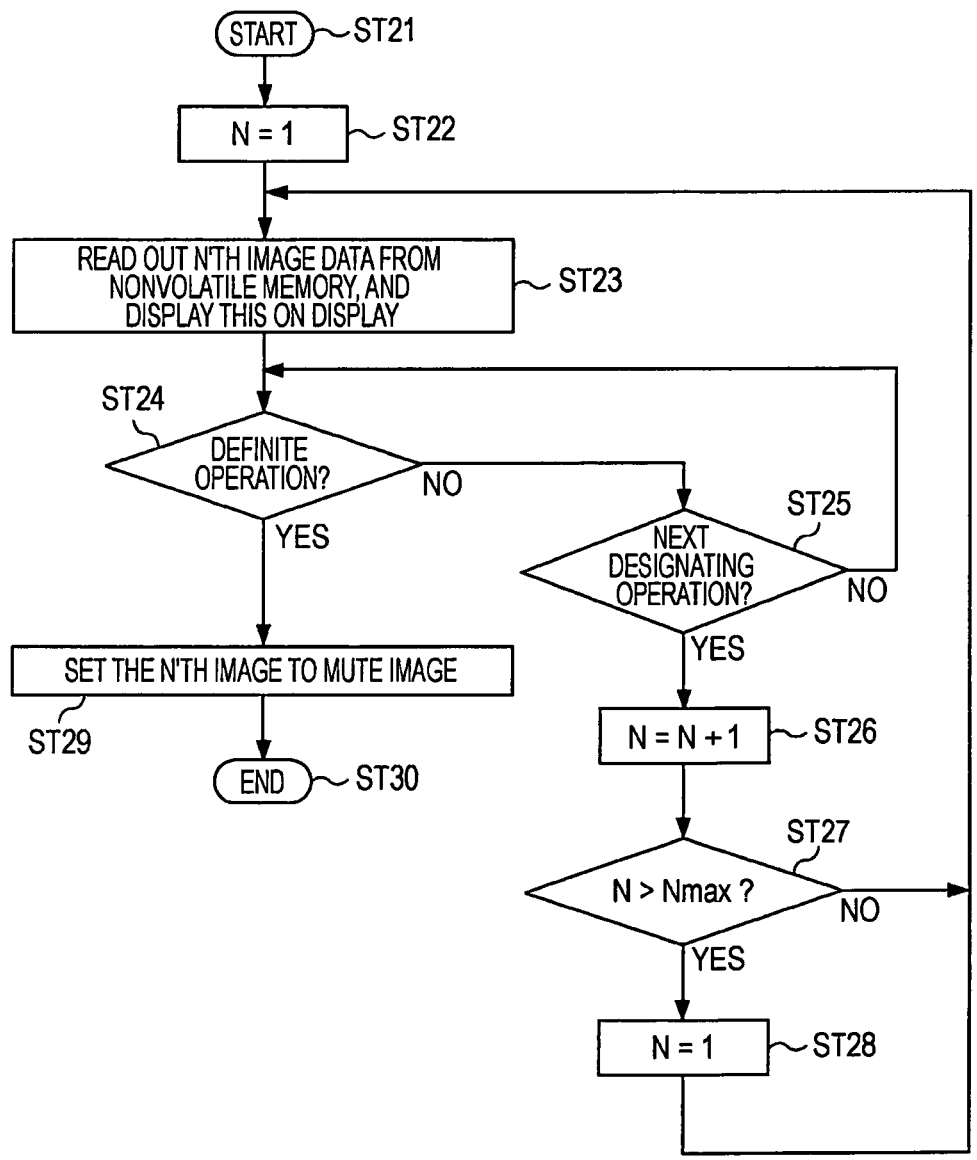
FIG. 8 is a flowchart illustrating mute image setting processing at the control unit of the terminal main unit.

The flowchart in FIG. 8 illustrates control processing at the control unit 121 at the time of setting a mute image. In this case, the control unit 121 makes up a mute image setting unit.

First, in step ST21, the control unit 121 starts the processing based on the user's mute image setting start operation, and subsequently, in step ST22, sets N=1. Subsequently, in step ST23 the control unit 121 reads out the N'th mute image data from the non-volatile memory 124, and displays this on the display 130. In this case, the control unit 121 performs control such that the N'th mute image data read out from the non-volatile memory 124 is supplied to the image compression/decompression unit 181, where the image data is subjected to the decompression processing, and the obtained image data is supplied to the display 130 from the display processing unit 183. Thus, the mute image according to the N'th mute image data is displayed on the display 130. Thus, the user can confirm the image according to the N'th mute image data beforehand.

Next, in step ST24, the control unit 121 determines whether or not a decision operation by the user has been performed. In the case of no decision operation having been performed, in step ST25 the control unit 121 determines whether or not a next designating operation by the user has been performed. In the case of no next designating operation having been performed, the control unit 121 returns to step ST24.

When determination is made in step ST25 that there has been performed a next designating operation, in step ST26 the control unit 121 increments the value of N by one. Subsequently, in step ST27, the control unit 121 determines whether or not N is greater than Nmax. Here, Nmax indicates the number of mute image data stored in the non-volatile memory 124. The control unit 121 keeps the value of N as is when N is not greater than Nmax, and on the other hand, when N is greater than Nmax, in step ST28 the control unit 121 sets N=1, and returns to step ST23.

When determination is made in step ST24 that there has been performed a decision operation, in step ST29 the control unit 121 sets the N'th mute image as the mute image to be used. Following the processing in step ST29, in step ST30 the control unit 121 ends the processing.

Note that with the communication terminal device 100 shown in FIG. 3, validity or invalidity of image muting, i.e., whether to validate or invalidate (enable or disable) interlocking (linking) between image muting and audio muting can be set. When interlocking between image muting and audio muting is valid, as described above, in response to a mute ON operation by the user, audio muting and image muting go to an ON state. On the other hand, when interlocking between image muting and audio muting is invalid, audio muting goes to an ON state in response to a mute ON operation by the user but image muting is still in an OFF state.

Figure 9:
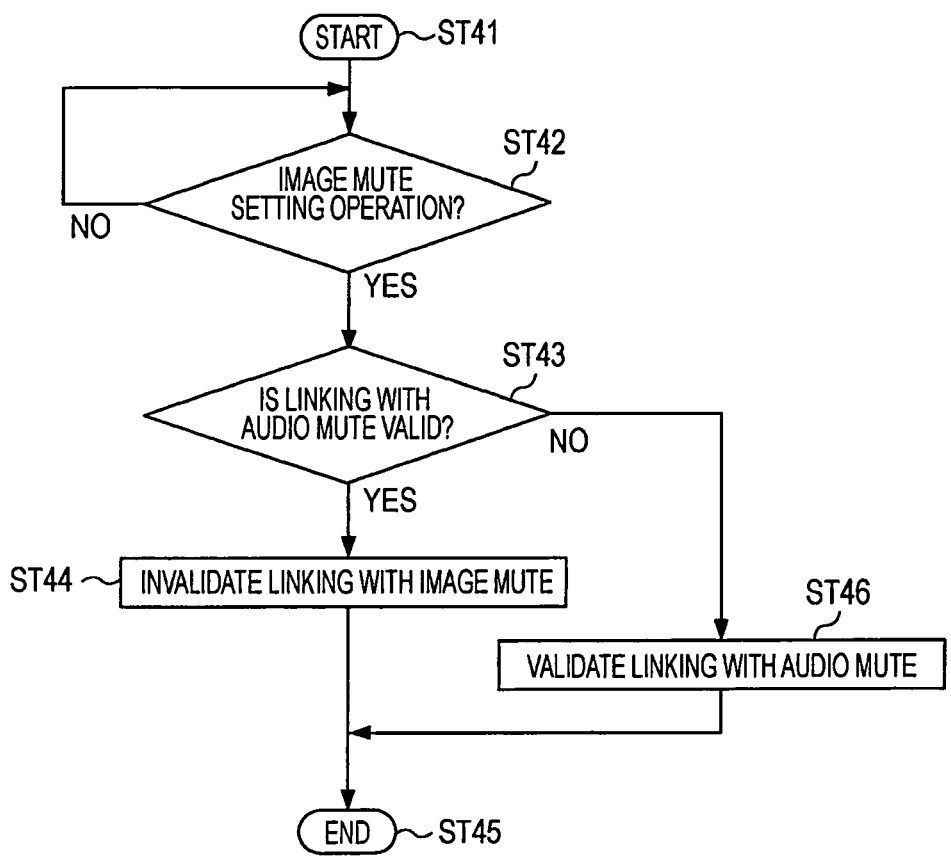
FIG. 9 is a flowchart illustrating interlocking setting processing between image muting and audio muting at the control unit of the terminal main unit.

The flowchart in FIG. 9 illustrates control processing at the control unit 121 at the time of setting interlocking between image muting and audio muting. In this case, the control unit 121 makes up an image mute setting unit.

First, in step ST41, the control unit 121 starts the processing based on the user's setting start operation, and subsequently, proceeds to step ST42. In step ST42, the control unit 121 determines whether or not there has been image mute setting operation (interlocking setting operation between image muting and audio muting) by the user. When determination is made that there has been performed a mute setting operation, in step ST43 the control unit 121 determines whether or not interlocking with audio muting is valid. When interlocking with audio muting is valid, in step ST44 the control unit 121 invalidates interlocking with audio muting, and subsequently, in step ST45 ends the processing. On the other hand, when interlocking with audio muting is invalid, in step ST46 the control unit 121 validates interlocking with audio muting, and subsequently, in step ST45 ends the processing.

In the case of image muting being valid, as described above, in a mute state, the image data input to the external input terminal 160, or the mute image data read out from the non-volatile memory 124 is supplied to the other communication terminal device 100, the mute image according to the image data thereof is displayed, and also the audio signal from the microphone 140, of which the level is attenuated, is supplied to the other communication terminal device 100, and the audio is subjected to muting.

On the other hand, in the case of image muting being invalid, even in a mute state, image muting is not performed. That is to say, in this case, the image data (imaged image data) output from the camera 110 is supplied to the other communication terminal device 100, and the imaged image according to the image data thereof is displayed. Note that in this case, the audio signal from the microphone 140, of which the level is attenuated, is supplied to the other communication terminal device 100, and the audio is subjected to muting.

As described above, with the communication terminal device 100 shown in FIGS. 2 and 3, the user can perform an image muting operation on the remote commander 170, and there is no need to take the trouble to go to a camera position to operate a shutter, and even in the case of frequently turning image muting on/off, the user can readily perform an image muting operation.

Also, with the communication terminal device 100 shown in FIGS. 2 and 3, the image data input to the external input terminal 160 or the image data output from the camera 110 is written in the non-volatile memory 124 as mute image data, whereby the mute image can be additionally registered. Accordingly, as a mute image to be transmitted to the other communication terminal device 100 in a mute state, various types of image can be employed, such as an image created at a computer, an image played at an image playing device such as a DVD player or the like, an imaged image, and so forth.

Also, with the communication terminal device 100 shown in FIGS. 2 and 3, mute image data to be used can be selected from the multiple types of mute image data stored in the non-volatile memory 124, based on the user's selection operation. Accordingly, the user can employ arbitrary image data by selecting this from the multiple types of mute image data.

Also, with the communication terminal device 100 shown in FIGS. 2 and 3, an arrangement is made wherein the terminal main unit 120 is configured so as to include an image switching unit 125 for selectively extracting imaged image data or mute image data, and the control unit 121 of the terminal main unit 120 controls the image switching unit 125 thereof depending on a mute released state or mute state. That is to say, the control unit 121 controls the switching operation of the image switching unit 125 included in the same terminal main unit 120 as itself, which simplifies the configuration of the control system according to image switching.

Also, with the communication terminal device 100 shown in FIGS. 2 and 3, compressed image data (compression-encoded image data) is store in the non-volatile memory 124 as mute image data. Accordingly, in a mute state, in the case of employing mute image data by reading out this from the non-volatile memory 124, the compression processing (compression encoding operation) at the image compression/decompression unit 181 can be stopped, the processing load at the terminal main unit 120 can be reduced, and also power-saving can be realized.

Also, with the communication terminal device 100 shown in FIGS. 2 and 3, the user performs a mute operation on the remote commander 170, whereby an image and audio can be muted simultaneously, and the time and effort relating to the user's operations can be reduced.

Also, with the communication terminal device 100 shown in FIGS. 2 and 3, validity or invalidity of image muting can be set. Accordingly, the user can arbitrarily set whether or not image muting can be performed simultaneously with audio muting.

Figure 10:
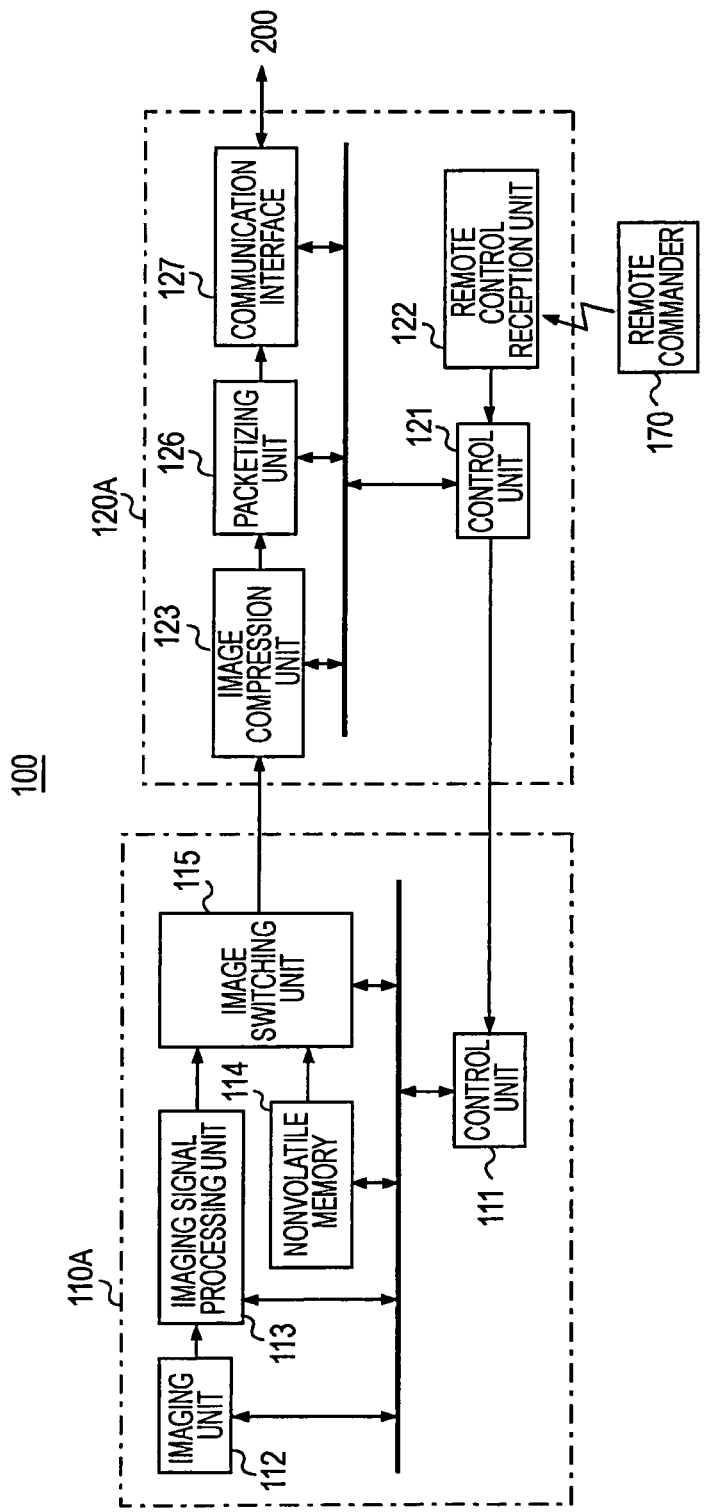
FIG. 10 is a block diagram illustrating another configuration example of the image transmission system of a communication terminal device making up the two-way communication system.

Next, another configuration example of the image data transmission system of the communication terminal device 100 will be described. FIG. 10 illustrates another configuration example of the image data transmission system of the communication terminal device 100. That is to say, in FIG. 10 also, in the same way as with FIG. 2, the image data reception system, audio data transmission system and reception system are omitted in the drawing. This communication terminal device 100 includes a camera 110A and a terminal main unit 120A. In FIG. 10, the components corresponding to those in FIG. 2 are denoted with the same reference numerals, and description thereof will be omitted as appropriate.

The camera 110A includes a control unit 111, an imaging unit 112, an imaging signal processing unit 113, non-volatile memory 114, and an image switching unit 115. The control unit 111 controls the operation of each unit of the camera 110A. The control unit 111 is configured of a CPU. The imaging unit 112, which includes an unshown imaging lens and imaging device, images a subject to output the imaged signal corresponding to the subject thereof. The imaging signal processing unit 113 subjects the imaging signal (analog signal) output from the imaging unit 112 to sample holding, gain control, conversion from the analog signal to a digital signal, white balance adjustment, gamma correction, and so forth, and outputs the image data (imaged image data).

The non-volatile memory 114 makes up a storage unit, and stores mute image data. The image switching unit 115 selectively extracts the image data (imaged image data) output from the imaging signal processing unit 113, or the mute image data read out from the non-volatile memory 114, and takes this as the output of the camera 110A.

The terminal main unit 120A includes a control unit 121, a remote control reception unit 122, an image compression unit 123, a packetizing unit 126, and a communication interface 127. The control unit 121 controls the operation of each unit of the terminal main unit 120a, and further, of the camera 110a. The control unit 121 is configured of a CPU. The remote control reception unit 122 receives a remote control signal generated from a remote commander 170 corresponding to the user's operation, such as an infrared light or the like. The remote control reception unit 122 is connected to the control unit 121. The remote control reception unit 122 supplies the operating signal corresponding to the received remote control signal to the control unit 121.

The image compression unit 123 compression-encodes the image data output from the camera 110A. The image compression unit 123 subjects the image data to the compression processing using a compression method in accordance with predetermined specifications, for example, such as H.323 standardized by ITU to generate compressed image data (compression-encoded image data). The packetizing unit 126 packetizes the compressed image data generated at the image compression unit 123 in a predetermined format. The communication interface 127 transmits the packet data obtained at the packetizing unit 126 to the other communication terminal device 100 via the network 200.

The operation of the image data transmission system of the communication terminal device 100 shown in FIG. 10 will be described. A subject is imaged by the imaging unit 112 of the camera 110A. For example, in the case of the two-way communication system 10 making up a video conference system, subjects are conference attendants. The imaging signal (analog signal) output from the imaging unit 112 is supplied to the imaging signal processing unit 113. At the imaging signal processing unit 113 the imaging signal thereof is subjected to analog signal processing such as sample holding, gain control, and so forth, A/D conversion processing, and further, digital signal processing such as white balance adjustment, gamma correction, and so forth, and then image data (imaged image data) is generated. This image data is supplied to the image switching unit 115.

With the image switching unit 115, in a mute released state, the imaged image data is extracted from the imaging signal processing unit 113. On the other hand, in a mute state, control information is supplied to the control unit 111 of the camera 110A from the control unit 121 of the terminal main unit 120A, mute image data is read out from the non-volatile memory 114 under the control of the control unit 111 and supplied to the image switching unit 115, and the mute image data thereof is extracted at the image switching unit 115. In this case, the control unit 111 makes up an image switching control unit.

Whether to set either a mute released state or a mute state is controlled by the control unit 121 of the terminal main unit 120A. That is to say, in a mute released state, when a mute button on the remote commander 170 is pressing-operated by the user, and the remote control signal for mute control is received at the remote control reception unit 122, the control unit 121 determines that a mute ON operation has been performed, and switches from a mute released state to a mute state. Conversely, in a image-muted state, when the remote control signal for mute control is similarly received at the remote control reception unit 122, the control unit 121 determines that a mute OFF operation has been performed, and switches from a mute state to a mute released state. In this case, the control unit 121 makes up a mute control unit.

The image data extracted at the image switching unit 115 of the camera 110A, i.e., the image data output from the camera 110A is supplied to the image compression unit 123 of the terminal main unit 120A. At the image compression unit 123 the image data is subjected to the compression processing, and compressed image data is generated. This compressed image data is supplied to the packetizing unit 126. At the packetizing unit 126 the compressed image data is packetized in a predetermined format. The packet data packetized and obtained at the packetizing unit 126 is transmitted to the other communication terminal device 100 via the network 200 by the communication interface 127.

In this case, in a mute released state, imaged image data is transmitted to the other communication terminal device 100, and the imaged image is displayed on the display of the other communication terminal device 100. On the other hand, in a mute state, mute image data is supplied to the other communication terminal device 100, and the mute image is displayed on the display of the other communication terminal device 100.

Figure 11:
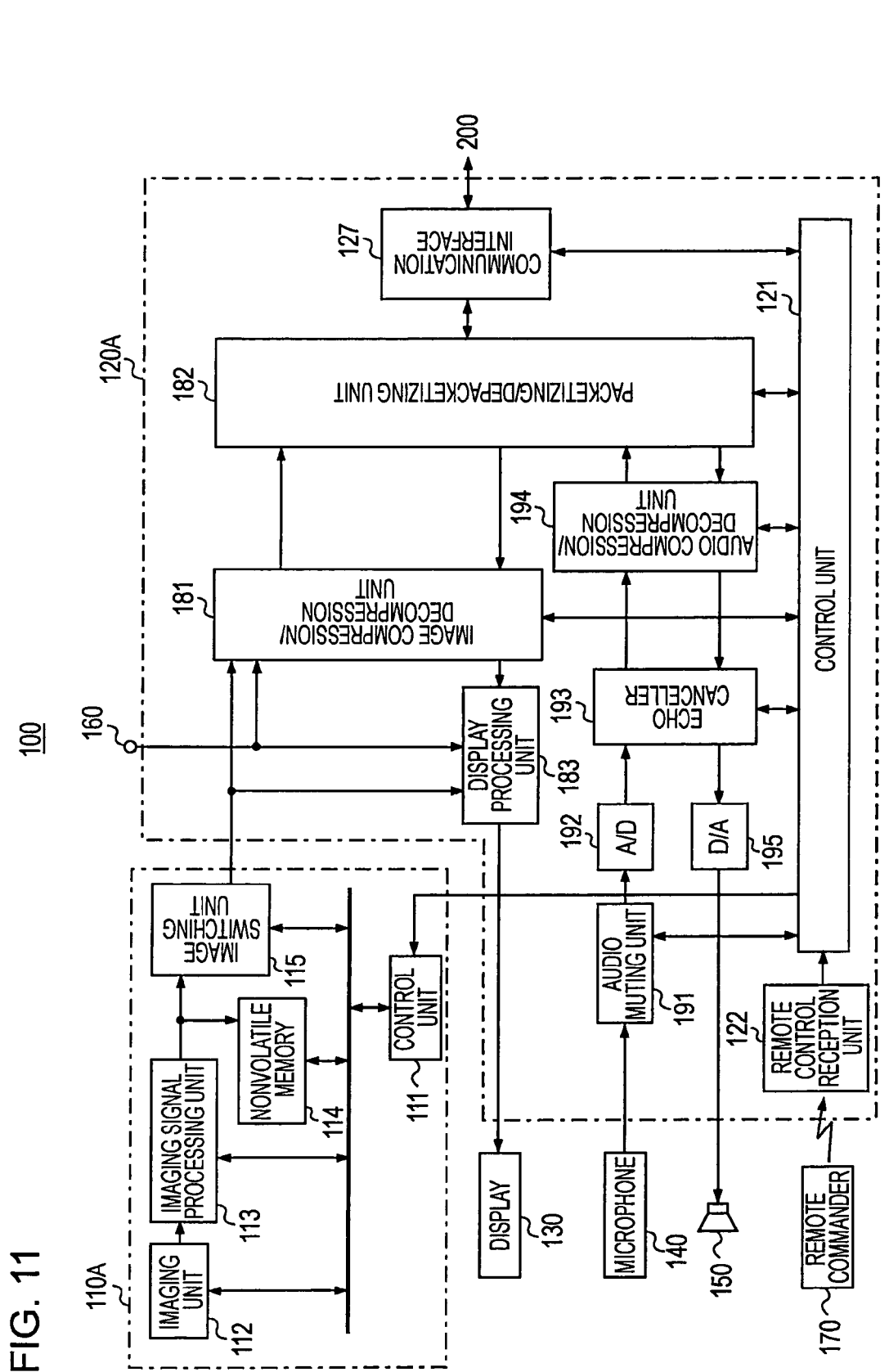
FIG. 11 is a block diagram illustrating another overall configuration example of the communication terminal device making up the two-way communication system.

FIG. 11 illustrates an overall configuration example of the communication terminal device 100, which corresponds to FIG. 10. In FIG. 11, the components corresponding to those in FIGS. 3 and 10 are denoted with the same reference numerals, and description thereof will be omitted as appropriate. This communication terminal device 100 includes a camera 110A, a terminal main unit 120A, a display 130, a microphone 140, speakers 150, and an external input terminal 160.

The camera 110A includes a control unit 111, an imaging unit 112, an imaging signal processing unit 113, non-volatile memory 114, and an image switching unit 115. The control unit 111 controls the operation of each unit of the camera 110A. The imaging unit 112 images a subject, and outputs the imaging signal corresponding to the subject thereof. The imaging signal processing unit 113 subjects the imaging signal (analog signal) output from the imaging unit 112 to sample holding, gain control, conversion from the analog signal to a digital signal, white balance adjustment, gamma correction, and so forth, and outputs the image data (imaged image data).

The non-volatile memory 114 makes up a storage unit, and stores mute image data. Here, one set or multiple sets of mute image data are stored in the non-volatile memory 114 beforehand. Also, the image data output from the imaging signal processing unit 113 is written in the non-volatile memory 114, whereby a predetermined number of mute image data can be registered. The registration of this mute image is performed under the control of the control unit 111 by control information being supplied to the control unit 111 of the camera 110A from the control unit 121 of the terminal main unit 120A based on the user's operation from the remote commander 170.

As described above, multiple sets of mute image data can be stored in the non-volatile memory 114. In the case of multiple sets of mute image data being stored in the non-volatile memory 114, the mute image data that should be used can be set. The setting of this mute image is performed under the control of the control unit 111 by control information being supplied to the control unit 111 of the camera 110A from the control unit 121 of the terminal main unit 120A based on the user's operation from the remote commander 170.

The image switching unit 115 selectively extracts the image data (imaged image data) output from the imaging signal processing unit 113, or the mute image data read out from the non-volatile memory 114, and takes this as the output of the camera 110A. In this case, in a mute released state, when transmitting the imaged image data to the other communication terminal device 100, the image switching unit 115 extracts the imaged image data obtained at the imaging signal processing unit 113. Also, in a mute state, when transmitting the mute image data stored in the non-volatile memory 114 to the other communication terminal device 100, the image switching unit 115 extracts the mute image data read out from the non-volatile memory 114 thereof.

Also, when registering a mute image, the image switching unit 115 extracts the image data output from the imaging signal processing unit 113. Further, when setting a mute image data, the image switching unit 115 extracts the mute image data read out from the non-volatile memory 114.

The terminal main unit 120A includes a control unit 121, a remote control reception unit 122, a communication interface 127, an image compression/decompression unit 181, a packetizing/depacketizing unit 182, a display processing unit 183, an audio muting unit 191, an A/D converter 192, an echo canceller 193, an audio compression/decompression unit 194, and a D/A converter 195.

The control unit 121 controls the operation of each unit of the terminal main unit 120A. The remote control reception unit 122 receives a remote control signal generated from the remote commander 170 corresponding to the user's operation, such as an infrared light or the like. The remote control reception unit 122 supplies the operating signal corresponding to the received remote control signal to the control unit 121.

The image compression/decompression unit 181 subjects the image data output from the camera 110A, or image data input to the external input terminal 160 from a computer or an image playing device such as a DVD (Digital Versatile Disc) player or the like to compression processing using a compression method in accordance with predetermined specifications, for example, such as H.323 standardized by ITU, to generate compressed image data (compression-encoded image data).

In this case, when transmitting the imaged image data to the other communication terminal device 100 in a mute released state, or when transmitting the mute image data read out from the non-volatile memory 114 to the other communication terminal device 100 in a mute state, the image compression/decompression unit 181 subjects the image data output from the camera 110A to the compression processing to generate compression-encoded image data.

Also, in a mute state, when transmitting the image data input to the external input terminal 160 to the other communication terminal device 100 as mute image data, the image compression/decompression unit 181 subjects the image input to the external input terminal 160 to the compression processing to generate compression-encoded image data.

Also, the image compression/decompression unit 181 subjects the compressed image data from the other communication terminal device 100, which is reconfigured by the packetizing/depacketizing unit 182, to the decompression processing to generate decoded image data (reception image data).

The packetizing/depacketizing unit 182 packetizes the compressed image data generated at the image compression/decompression unit 181, and the compressed audio data obtained at the audio compression/decompression unit 194 in a predetermined format, and outputs the obtained packet data to the communication interface 127. Also, the packetizing/depacketizing unit 182 extracts compressed image data and compressed audio data from the packet data transmitted from the other communication terminal device 100, which is received at the communication interface 127, transmits the extracted compressed image data to the image compression/decompression unit 181, and transmits the extracted compressed audio data to the audio compression/decompression unit 194.

The communication interface 127 transmits the packet data obtained at the packetizing/depacketizing unit 182 to the other communication terminal device 100 via the network 200. Also, the communication interface 127 receives the packet data transmitted from the other communication terminal device 100 via the network 200, and transmits this to the packetizing/depacketizing unit 182.

The image data output from the camera 110A, the image data input to the external input terminal 160, and the decoded image data (reception image data) obtained at the image compression/decompression unit 181 are supplied to the display processing unit 183. The display processing unit 183 supplies such image data as is or after processing to the display 130.

For example, in the case of performing full screen display under communication with the other communication terminal device 100, the display processing unit 183 supplies the reception image data obtained at the image compression/decompression unit 181 as is to the display 130. In this case, the image according to the image data received from the other communication terminal device 100 is full-screen-displayed on the display 130.

Also, for example, in the case of performing two-screen display under communication with the other communication terminal device 100, based on the reception image data obtained at the image compression/decompression unit 181, and the image data output from the camera 110A or the image data input to the external input terminal 160, the display processing unit 183 generates new image data for arraying and displaying the images according to those two sets of image data on the same screen, and supplies the new image data thereof to the display 130. In this case, the image according to the image data received from the other communication terminal device 100, and the image according to the image data transmitted to the other communication terminal device 100 are arrayed and displayed on the display 130.

Also, for example, when registering a mute image, the display processing unit 183 supplies the image data output from the camera 110A as is to the display 130. In this case, the image according to the image data written in the non-volatile memory 114 is displayed on the display 130. Also, for example, when setting a mute image, the display processing unit 183 supplies the image data output from the camera 110A as is to the display 130. In this case, the image according to the image data (mute image data candidate) read out from the non-volatile memory 114 is displayed on the display 130.

The audio muting unit 191 is disposed between the microphone 140 and A/D converter 192. In a mute released state, the audio muting unit 191 does not attenuate the level of the audio signal supplied from the microphone 140 to the A/D converter 192. On the other hand, in a mute sate, the audio muting unit 191 attenuates the level of the audio signal supplied from the microphone 140 to the A/D converter 192.

The A/D converter 192 converts the audio signal (analog signal) supplied from the microphone 140 into a digital signal. The echo canceller 193 generates a correction signal based on the decoded audio data obtained at the audio compression/decompression unit 194, and corrects the audio data obtained at the A/D converter 192 using the correction signal thereof to secure speech quality.

The audio compression/decompression unit 194 subjects the audio data (transmission audio data) corrected at the A/D converter 192 through echo canceller 193 to compression processing of a compression method in accordance with predetermined specifications such as H.323 or the like in the same way as with the above-mentioned image data to generate compressed audio data. Also, the audio compression/ decompression unit 194 subjects the compressed audio data from the other communication terminal device 100, which is reconfigured at the packetizing/depacketizing unit 182, to the decompression processing to generate decoded audio data (reception audio data).

The operation at the time of communication of the communication terminal device 100 shown in FIG. 11 will be described. First, the operation of the transmission system will be described.

A subject is imaged by the imaging unit 112 of the camera 110A. For example, in the case of the two-way communication system 10 (see FIG. 1) making up a video conference system, subjects are conference attendants. The imaging signal (analog signal) output from the imaging unit 112 is supplied to the imaging signal processing unit 113. At the imaging signal processing unit 113 the imaging signal thereof is subjected to analog signal processing such as sample holding, gain control, and so forth, A/D conversion processing, and further, digital signal processing such as white balance adjustment, gamma correction, and so forth, and then image data (imaged image data) is generated.

The image data output from the imaging signal processing unit 113 is supplied to the image switching unit 115. The operation of the image transmission system of the image switching unit 115 and thereafter will be described by dividing this into a mute released state and a mute state.

First, description will be made regarding the case of being in a mute released state. At the image switching unit 115 of the camera 110A the imaged image data is extracted from the imaging signal processing unit 113. The imaged image data extracted at the image switching unit 115 is supplied to the image compression/decompression unit 181 of the terminal main unit 120A as the output image data of the camera 110A. At the image compression/decompression unit 181 the imaged image data is subjected to the compression processing, and compressed image data is generated. Subsequently, this compressed image data is supplied to the packetizing/depacketizing unit 182.

Next, description will be made regarding the case wherein in a mute state, the image data input to the external input terminal 160 is employed as mute image data. At the image compression/decompression unit 181 the image data input to the external input terminal 160 is subjected to the compression processing, and compressed image data is generated. Subsequently, this compressed image data is supplied to the packetizing/depacketizing unit 182.

Also, description will be made regarding the case wherein in a mute state, the mute image data stored in the non-volatile memory 114 is employed. In this case, predetermined mute image data, which is set as mute image data to be used beforehand, is read out from the non-volatile memory 114 by the control of the control unit 111. Subsequently, under the control of the control unit 111, at the image switching unit 115 the mute image data read out from the non-volatile memory 114 is extracted. The mute image data extracted at the image switching unit 115 is supplied to the image compression/decompression unit 181 of the terminal main unit 120A as the output image data of the camera 110A. At the image compression/decompression unit 181 the mute image data is subjected to the compression processing, and compressed image data is generated. Subsequently, this compressed image data is supplied to the packetizing/depacketizing unit 182.

Note that in mute state, whether to use the image data input to the external input terminal 160 or the mute image data stored in the non-volatile memory 114 can be changed by the user operating the remote commander 170 as appropriate.

Also, the audio signal output from the microphone 140 is supplied to the A/D converter 192 via the audio muting unit 191, and converted from the analog signal to a digital signal. The audio muting unit 191 is disposed between the microphone 140 and the A/D converter 192. At the audio muting unit 191 the level of the audio signal supplied to the A/D converter 192 from the microphone 140 is attenuated not in a mute released state but in a mute state.

The audio data obtained at the A/D converter 192 is supplied to the audio compression/decompression unit 194 via the echo canceller 193. At the audio compression/decompression unit 194 the audio data (transmission audio data) is subjected to the compression processing, and compressed audio data is generated. Subsequently, this compressed audio data is supplied to the packetizing/depacketizing unit 182.

At the packetizing/depacketizing unit 182 the compressed image data supplied from the image compression/decompression unit 181 and the compressed audio data supplied from the audio compression/decompression unit 194 are packetized in a predetermined format, and the obtained packet data is transmitted to the other communication terminal device 100 via the network 200 by the communication interface 127.

Thus, in a mute released state, the imaged image data obtained at the imaging signal processing unit 113 of the camera 110A is supplied to the other communication terminal device 100, and the image according to the imaged image data thereof is displayed. Also, in a mute released state, the audio signal from the microphone 140 is supplied to the other communication terminal device 100, of which the level is not attenuated, and the audio according to the audio signal thereof is output.

On the other hand, in a mute state, the image data input to the external input terminal 160, or the mute image data read out from the non-volatile memory 114 is supplied to the other communication terminal device 100, and the mute image according to the image data thereof is displayed. Also, in a mute state, the audio signal from the microphone 140 is supplied to the other communication terminal device 100, of which the level is attenuated, and the audio is subjected to muting.

Here, whether to set the mute released state or mute state is controlled by the control unit 121. That is to say, in a mute released state, when the mute button on the remote commander 170 is pressed by the user, and the remote control signal for mute control is received at the remote control reception unit 122, the control unit 121 determines that a mute ON operation has been performed, and switches from a mute released state to a mute state. Conversely, in a mute state, similarly, when the remote control signal for mute control is received at the remote control reception unit 122, the control unit 121 determines that a mute OFF operation has been performed, and switches from a mute state to a mute released state. Information indicating whether the current state is a mute released state or mute state is supplied to the control unit 111 of the camera 110A from the control unit 121 as control information. The control unit 111 controls, based on the control information thereof, switching at the image switching unit 115, and reading out mute image data from the non-volatile memory 114 depending on each state of a mute released state and mute state.

Next, the operation of the reception system will be described. The packet data transmitted from the other communication terminal device 100 via the network 200, which is received at the communication interface 127, is supplied to the packetizing/depacketizing unit 182. At the packetizing/depacketizing unit 182 compressed image data and compressed audio data are extracted from the packet data supplied from the communication interface 127, and the compressed image data is supplied to the image compression/decompression unit 181, and the audio compressed data is supplied to the audio compression/decompression unit 194.

At the image compression/decompression unit 181 the compressed image data supplied from the packetizing/depacketizing unit 182 is subjected to the decompression processing, and decoded image data (reception image data) is generated. This image data is supplied to the display processing unit 183. Subsequently, in the case of full screen display being performed on the display 130, the reception image data obtained at the image compression/decompression unit 181 is supplied as is from the display processing unit 183 to the display 130, and the image according to the reception image data from the other communication terminal device 100 is full-screen-displayed on the display 130.

Also, in the case of two-screen display being performed on the display 130, with the display processing unit 183, based on the reception image data obtained at the image compression/decompression unit 181, and the image data output from the camera 110A or the image data input to the external input terminal 160, new image data for arraying and displaying the images according to those two sets of image data on the same screen is generated. Subsequently, the new image data thereof is supplied from the display processing unit 183 to the display 130, and the image according to the reception image data from the other communication terminal device 100, and the image according to the transmission image data transmitted to the other communication terminal device 100 are arrayed and displayed on the display 130.

Note here that the transmission image data is imaged image data at the time of a mute released state, the relevant image data when employing the image data input to the external input terminal 160 in a mute state, and the relevant mute image data when employing the mute image data read out from the non-volatile memory 114 in a mute state.

Also, at the audio compression/decompression unit 194 the compressed audio data supplied from the packetizing/depacketizing unit 182 is subjected to the decompression processing, and decoded audio data (reception audio data) is generated. This reception audio data is supplied to the D/A converter 195 via the echo canceller 193, where the digital signal is converted into an analog signal. Subsequently, the reception audio signal output from the D/A converter 195 is supplied to the speakers 150. Thus, the audio according to the reception audio signal is output from the speakers 150.

Next, the operation at the time of registering a mute image of the communication terminal device 100 shown in FIG. 11 will be described. As described above, the imaged image data obtained at the imaging signal processing unit 113 is written in the non-volatile memory 114, whereby a predetermined number of mute image data can be newly registered.

Upon the user performing a mute image registration start operation on the remote commander 170, the operating information thereof is transmitted to the control unit 121 of the terminal main unit 120A, and further transmitted from the control unit 121 to the control unit 111 of the camera 110A, and registration processing is started. In this case, the imaged image data from the imaging signal processing unit 113 is extracted at the image switching unit 115, the imaged image data thereof is supplied to the display 130 from the display processing unit 183, and the imaged image is displayed on the display 130. Thus, the imaged image is displayed on the display 130, whereby the user can confirm the imaged image to be registered as a mute image beforehand.

In this state, upon the user performing a decision operation on the remote commander 170, the operating information thereof is transmitted to the control unit 121 of the terminal main unit 120A, and further transmitted from the control unit 121 to the control unit 111 of the camera 110A, one frame worth of the image data obtained at the imaging signal processing unit 113 is written in the non-volatile memory 114 under the control of the control unit 111, and registration for new mute image data is performed.

Next, the operation at the time of setting a mute image of the communication terminal device 100 shown in FIG. 11 will be described. As described above, in the case of multiple sets of mute image data being stored in the non-volatile memory 114, the mute image data that should be used can be set.

Upon the user performing a mute image setting start operation on the remote commander 170, the operating information thereof is transmitted to the control unit 121 of the terminal main unit 120A, and further transmitted from the control unit 121 to the control unit 111 of the camera 110A, and setting processing is started.

In this case, first mute image data is read out from the non-volatile memory 114, the mute image data read out from the non-volatile memory 114 is extracted at the image switching unit 115, the mute image data thereof is supplied to the display 130 from the display processing unit 183, and the first mute image is displayed on the display 130.

In this state, upon the user performing a next designating operation on the remote commander 170, the operating information thereof is transmitted to the control unit 121 of the terminal main unit 120A, and further transmitted from the control unit 121 to the control unit 111 of the camera 110A, second mute image data is read out from the non-volatile memory 114, and the second mute image is displayed on the display 130. Hereafter, similarly, each time the user performs a next designating operation, the next mute image data is read out from the non-volatile memory 114, and the image according to the mute image data thereof is displayed on the display 130.

In a state wherein predetermined mute image data is read out from the non-volatile memory 114, and the mute image according thereto is displayed on the display 130, upon the user performing a next designating operation on the remote commander 170, the operating information thereof is transmitted to the control unit 121 of the terminal main unit 120A, and further transmitted from the control unit 121 to the control unit 111 of the camera 110A, the relevant predetermined mute image data is set as the mute image data to be used.

Note that with the communication terminal device 100 shown in FIG. 11 also, in the same way as with the communication terminal device 100 shown in FIG. 3, in the event that a mute ON operation by the user is performed, image muting for switching the image to be transmitted to the other communication terminal device 100 from the imaged image to the mute image can be validate or invalid.

As described above, with the communication terminal device 100 shown in FIGS. 10 and 11, in the same way as with the above-mentioned communication terminal device 100 shown in FIGS. 2 and 3, an advantage is provided wherein the user can perform an image muting operation on the remote commander 170, so there is no need to take the trouble to go to a camera position to operate a shutter, and even in the case of frequently turning image muting on/off, the user can readily perform image muting operations.

Also, with the communication terminal device 100 shown in FIGS. 10 and 11, an arrangement is made wherein the camera 110A includes the non-volatile memory 114 and image switching unit 115, in the case of employing the mute image data stored in the non-volatile memory 114 in a mute state, under the control of the control unit 111 of the camera 110A, the mute image data is read out from the non-volatile memory 114, and also the mute image data thereof is extracted at the image switching unit 115. Accordingly, the control unit (mute control unit) 121 of the terminal main unit 120A not only can supply control information whether the current state is a mute released state or mute state to the control unit (switching control unit) 111 of the camera 110A but also can reduce the processing load of the CPU making up the control unit (mute control unit) 121.

It should be understood by those skilled in the art that various modifications, combinations, sub-combinations and alterations may occur depending on design requirements and other factors insofar as they are within the scope of the appended claims or the equivalents thereof.

What is claimed is:

1. A two-way communication system in which a plurality of communication terminal devices are mutually connected via a network, each of said communication terminal devices comprising:
   a camera; and
   a terminal main unit;
   wherein said camera includes
      an imaging unit configured to image a subject to output image data;
   and wherein said terminal main unit includes
      a remote control signal reception unit configured to receive a remote control signal,
      a communication unit configured to transmit image data to another communication terminal device, and
      a mute control unit configured to selectively switch said image data transmitted from said communication unit to image data output from said imaging unit or mute image data, based on a remote control signal for mute control received at said remote control signal reception unit and by determining whether a setting to validate or invalidate interlocking between image muting and audio muting is set, wherein, when the setting to validate or invalidate the interlocking is set and the interlocking is invalid, the image data transmitted from said communication unit is the image data output from said imaging unit when mute control is in a mute ON state, wherein the mute image data is an image selected, from a plurality of registered mute images corresponding respectively to a plurality of registered image data stored in a memory, based on a user's selection operation that sets the registered image data corresponding to the image selected as the mute image data, the plurality of registered mute images including an image imaged by said imaging unit and an image input to an external input terminal of the communication terminal device configured to input image data.

2. A communication terminal device to be connected to another communication terminal device via a network, comprising:
   a remote control signal reception unit configured to receive a remote control signal;
   a communication unit configured to transmit image data to said other communication terminal device; and
   a mute control unit configured to selectively switch said image data transmitted from said communication unit to imaged image data or mute image data, based on a remote control signal for mute control received at said remote control signal reception unit and by determining whether a setting to validate or invalidate interlocking between image muting and audio muting is set, wherein, when the setting to validate or invalidate the interlocking is set and the interlocking is invalid, the image data transmitted from said communication unit is the imaged image data when mute control is in a mute ON state, wherein the mute image data is an image selected, from a plurality of registered mute images corresponding respectively to a plurality of registered image data stored in a memory, based on a user's selection operation that sets the registered image data corresponding to the image selected as the mute image data, the plurality of registered mute images including an image imaged at the communication terminal device and an image input at an external input terminal of the communication terminal device configured to input image data.

3. A communication terminal device to be connected to another communication terminal device via a network, comprising:
   a camera; and
   a terminal main unit;
   and wherein said camera includes
      an imaging unit configured to image a subject to output image data;
   and wherein said terminal main unit includes
      a remote control signal reception unit configured to receive a remote control signal,
      a communication unit configured to transmit image data to said other communication terminal device, and
      a mute control unit configured to selectively switch said image data transmitted from said communication unit to image data output from said imaging unit or mute image data, based on a remote control signal for mute control received at said remote control signal reception unit and by determining whether a setting to validate or invalidate interlocking between image muting and audio muting is set, wherein, when the setting to validate or invalidate the interlocking is set and the interlocking is invalid, the image data transmitted from said communication unit is the image data output from said imaging unit when mute control is in a mute ON state, wherein the mute image data is an image selected, from a plurality of registered mute images corresponding respectively to a plurality of registered image data stored in a memory, based on a user's selection operation that sets the registered image data corresponding to the image selected as the mute image data, the plurality of registered mute images including an image imaged by said imaging unit and an image input at an external input terminal of the communication terminal device configured to input image data.

4. The communication terminal device according to claim 3, wherein said camera or said terminal main unit includes a storage unit configured to store said mute image data;
   and wherein with said terminal main unit, said storage unit includes
      a mute image registration unit configured to write said mute image data.

5. The communication terminal device according to claim 4, wherein said mute image registration unit writes the image data output from said imaging unit in said storage unit.

6. The communication terminal device according to claim 4, wherein said terminal main unit includes the external input terminal;
   and wherein said mute image registration unit writes image data input to said external input terminal in said storage unit.

7. The communication terminal device according to claim 3, wherein said camera or said terminal main unit includes a storage unit configured to store the plurality of registered image data;

and wherein said terminal main unit includes a mute image selecting unit configured to select the image selected from the plurality of registered mute images corresponding respectively to the plurality of registered image data written in said storage unit, based on the user's selection operation.

8. The communication terminal device according to claim 3, wherein said terminal main unit includes a storage unit configured to store said mute image data, and an image switching unit configured to selectively extract image data output from said imaging unit or mute image data read out from said storage unit;

and wherein said mute control unit controls the switching operation of said image switching unit, based on said remote control signal for mute control.

9. The communication terminal device according to claim 8, wherein said terminal main unit includes an image compression unit configured to compression-encode image data output from said imaging unit;

and wherein mute image data stored in said storage unit is compression-encoded;

and wherein said image switching unit extracts compression-encoded image data output from said image compression unit or compression-encoded mute image data read out from said storage unit.

10. The communication terminal device according to claim 3, wherein said camera includes a storage unit configured to store said mute image data, an image switching unit configured to selectively extract image data output from said imaging unit or mute image data read out from said storage unit, and a switching control unit configured to control the switching operation of said image switching unit;

and wherein said mute control unit supplies control information to said switching control unit, based on said remote control signal for mute control.

11. The communication terminal device according to claim 3, further comprising:

a microphone;

wherein said communication unit transmits said image data, and audio data output from said microphone to said other communication terminal device;

and wherein said terminal main unit further includes an audio muting unit configured to mute said audio data transmitted from said communication unit;

and wherein said mute control unit selectively switches said image data transmitted from said communication unit to image data output from said imaging unit or mute image data, and also controls the mute operation of said audio muting unit, based on a remote control signal for mute control received at said remote control signal reception unit.

12. The communication terminal device according to claim 11, wherein said terminal main unit further includes an image mute setting unit configured to validate or invalidate control operation wherein when said remote control signal for mute control is in the mute ON state, said mute control unit switches said image data transmitted from said communication unit to said mute image data, based on a user's operation.

13. An image mute control method for a communication terminal device to be connected to another communication terminal device via a network, comprising the steps of:

receiving a remote control signal for mute control, which is a first step; and switching image data to be transmitted to said other communication terminal device based on the remote control signal for mute control received in said first step and by determining whether a setting to validate or invalidate interlocking between image muting and audio muting is set, which is a second step;

wherein, in said second step, when the setting to validate or invalidate the interlocking is set, the interlocking is invalid and said remote control signal for mute control is in a mute ON state, imaged image data, the imaged image data being other than mute image data, is taken as image data to be transmitted to said communication terminal device, wherein the mute image data is an image selected, from a plurality of registered mute images corresponding respectively to a plurality of registered image data stored in a memory, based on a user's selection operation that sets the registered image data corresponding to the image selected as the mute image data, the plurality of registered mute images including an image imaged at the communication terminal device and an image input at an external input terminal of the communication terminal device configured to input image data, and when the setting to validate or invalidate the interlocking is set, the interlocking is valid and said remote control signal for mute control is in the mute ON state, the mute image data is taken as image data to be transmitted to said communication terminal device.

* * * * *